US011163395B2

(12) United States Patent
Hong et al.

(10) Patent No.: US 11,163,395 B2
(45) Date of Patent: Nov. 2, 2021

(54) TOUCH SENSOR AND METHOD FOR SENSING TOUCH USING THEREOF

(71) Applicant: Samsung Display Co., Ltd., Yongin-si (KR)

(72) Inventors: Won Ki Hong, Yongin-si (KR); Jong Seo Lee, Yongin-si (KR)

(73) Assignee: Samsung Display Co., Ltd.

( * ) Notice: Subject to any disclaimer, the term of this patent is extended or adjusted under 35 U.S.C. 154(b) by 196 days.

(21) Appl. No.: 15/353,606

(22) Filed: Nov. 16, 2016

(65) Prior Publication Data

US 2017/0357361 A1    Dec. 14, 2017

(30) Foreign Application Priority Data

Jun. 13, 2016    (KR) .................... 10-2016-0073200

(51) Int. Cl.
*G06F 3/041*    (2006.01)
*G06F 3/0488*    (2013.01)
(Continued)

(52) U.S. Cl.
CPC ............ *G06F 3/0416* (2013.01); *B60K 35/00* (2013.01); *B60K 37/06* (2013.01); *B60W 10/04* (2013.01); *B60W 10/10* (2013.01); *B60W 10/18* (2013.01); *B60W 10/20* (2013.01); *B60W 30/18154* (2013.01); *B60W 30/18163* (2013.01); *B60W 50/082* (2013.01); *B60W 50/10* (2013.01); *B60W 50/14* (2013.01); *B62D 1/00* (2013.01); *G05D 1/0016* (2013.01); *G05D 1/0088* (2013.01); *G05D 1/021* (2013.01); *G06F 3/0414* (2013.01); *G06F 3/0445* (2019.05); *G06F 3/0447* (2019.05); *G06F 3/0482* (2013.01);
(Continued)

(58) Field of Classification Search
None
See application file for complete search history.

(56) References Cited

U.S. PATENT DOCUMENTS 4,736,191 A * 4/1988 Matzke ................ G06F 3/0213
341/20
7,538,760 B2    5/2009 Hotelling et al.
(Continued)

FOREIGN PATENT DOCUMENTS

CN    102214038 A    10/2011
CN    103902119 A    7/2014
(Continued)

OTHER PUBLICATIONS

EP17163772.1 European Search Report, dated Jun. 26, 2017, pp. 1-17.

*Primary Examiner* — Amare Mengistu
*Assistant Examiner* — Sarvesh J Nadkarni
(74) *Attorney, Agent, or Firm* — Innovation Counsel LLP

(57) ABSTRACT

The present disclosure relates to a touch sensor and a method for sensing a touch using the same, the touch sensor including a substrate, a first sensor and a plurality of second sensors provided on the substrate and configured to sense a location and a force of a touch, wherein the first sensor is disposed in a central area of one surface of the substrate, the plurality of second sensors are arranged to surround the first sensor, and a width of the plurality of second sensors increases as a distance from the central area increases.

18 Claims, 22 Drawing Sheets

(51) Int. Cl.

| | | |
|---|---|---|
| *G05D 1/00* | (2006.01) | |
| *B60W 50/10* | (2012.01) | |
| *B62D 1/00* | (2006.01) | |
| *B60W 30/18* | (2012.01) | |
| *B60K 35/00* | (2006.01) | |
| *G06F 3/044* | (2006.01) | |
| *B60K 37/06* | (2006.01) | |
| *B60W 10/04* | (2006.01) | |
| *B60W 10/10* | (2012.01) | |
| *B60W 10/18* | (2012.01) | |
| *B60W 10/20* | (2006.01) | |
| *B60W 50/08* | (2020.01) | |
| *B60W 50/14* | (2020.01) | |
| *G05D 1/02* | (2020.01) | |
| *G06F 3/0482* | (2013.01) | |

(52) U.S. Cl.
CPC ........ *G06F 3/0488* (2013.01); *G06F 3/04883* (2013.01); *G06F 3/04886* (2013.01); *B60K 2370/11* (2019.05); *B60K 2370/1438* (2019.05); *B60W 2050/143* (2013.01); *B60W 2050/146* (2013.01); *B60W 2420/42* (2013.01); *B60W 2420/52* (2013.01); *B60W 2540/215* (2020.02); *B60W 2710/00* (2013.01); *G05D 2201/0213* (2013.01); *G06F 3/0448* (2019.05); *G06F 2203/04105* (2013.01); *G06F 2203/04106* (2013.01); *G06F 2203/04803* (2013.01)

(56) References Cited

U.S. PATENT DOCUMENTS

| | | | |
|---|---|---|---|
| 8,654,524 B2 | 2/2014 | Pance et al. | |
| 8,686,952 B2 | 4/2014 | Burrough et al. | |
| 8,704,787 B2 | 4/2014 | Yamamoto et al. | |
| 8,787,006 B2 | 7/2014 | Golko et al. | |
| 8,942,881 B2 | 1/2015 | Hobbs et al. | |
| 9,164,637 B2 | 10/2015 | Jo | |
| 9,178,509 B2 | 11/2015 | Bernstein et al. | |
| 9,274,660 B2 | 3/2016 | Bernstein et al. | |
| 10,042,455 B2 | 8/2018 | Kawamura | |
| 2004/0252109 A1* | 12/2004 | Trent, Jr. | G06F 3/03547 345/174 |
| 2008/0143681 A1* | 6/2008 | XiaoPing | G06F 3/044 345/173 |
| 2009/0256807 A1* | 10/2009 | Nurmi | G06F 3/0414 345/173 |
| 2011/0242029 A1 | 10/2011 | Kasahara et al. | |
| 2013/0197736 A1 | 8/2013 | Zhu et al. | |
| 2014/0028575 A1 | 1/2014 | Parivar et al. | |
| 2014/0085213 A1 | 3/2014 | Huppi et al. | |
| 2014/0292699 A1* | 10/2014 | Ando | G06F 3/0418 345/173 |
| 2014/0293145 A1 | 10/2014 | Jones et al. | |
| 2014/0318295 A1 | 10/2014 | Kim et al. | |
| 2015/0248218 A1 | 9/2015 | Magahern et al. | |
| 2016/0253019 A1* | 9/2016 | Geaghan | G06F 3/041 345/174 |

FOREIGN PATENT DOCUMENTS

| | | |
|---|---|---|
| CN | 204808290 U | 11/2015 |
| JP | 2011-258043 A | 12/2011 |
| JP | 2014-095968 A | 5/2014 |
| KR | 10-1171793 B1 | 8/2012 |
| KR | 10-1488307 B1 | 10/2014 |
| KR | 10-2015-0074873 A | 7/2015 |
| WO | 2015041268 A1 | 3/2015 |
| WO | 2015179760 A1 | 11/2015 |

* cited by examiner

TOUCH SENSOR AND METHOD FOR SENSING TOUCH USING THEREOF

CROSS-REFERENCE TO RELATED APPLICATION

This application claims priority to and the benefit of Korean Patent Application No. 10-2016-0073200, filed on Jun. 13, 2016, in the Korean Intellectual Property Office, the entire content of which is incorporated herein by reference in its entirety.

BACKGROUND

Field

Various embodiments of the present disclosure relate to a touch sensor and a method for sensing a touch using the same.

Description of Related Art

As the interest in information displays grows and demand to use portable information media increases, studies and commercialization are being concentrated on display devices.

Recent display devices are being equipped with image display functions and touch sensors for receiving inputs of users' touches. Accordingly, users have become able to use display devices more conveniently through touch sensors.

Further, recent efforts have been made to provide various functions to users using not only touch locations but also using forces occurred by users' touches.

SUMMARY

A purpose of the present disclosure is to provide a touch sensor structure optimized to a circular form.

Another purpose of the present disclosure is to provide a method for complexly identifying a touched point and an intensity of the touch using the touch sensor optimized to the circular form.

According to an embodiment of the present disclosure, there is provided a touch sensor including a substrate; and a first sensor and a plurality of second sensors provided on the substrate, and configured to sense a location and a force of a touch, wherein the first sensor is disposed in a central area of one surface of the substrate, the plurality of second sensors are arranged to surround the first sensor, and a width of the plurality of second sensors increases as a distance from the central area increases.

Further, the plurality of second sensors may be provided on another surface facing the one surface of the substrate.

Further, the first sensor may be a force sensing sensor, and the plurality of second sensors may be capacitive sensors.

Further, the touch sensor may further include a buffer member provided on the one surface of the substrate, spaced apart from the first sensor and formed to surround at least a portion of the first sensor.

Further, the first sensors may include a plurality of sensors.

Further, the substrate may be a flat plane substrate having a circular shape.

Further, the substrate may be a three-dimensional substrate having a dome shape.

Further, the touch sensor may further include a sensor controller that computes the location and intensity of force of the touch using a sensing signal obtained from the first sensor and the plurality of second sensors.

Further, the sensor controller may compute the location of the touch with reference to a polar coordinate.

Further, the sensor controller may compute an angle coordinate of the touch with reference to the sensing signal obtained from the plurality of second sensors.

Further, the sensor controller may compute a distance coordinate with reference to a time difference between the touch is sensed by the first sensor and the touch is sensed by the second sensor.

Further, the sensor controller may compute the intensity of the force sensed by the first sensor.

Further, the sensor controller may compensate for the sensed intensity of the force with reference to the distance coordinate of the touch.

According to another embodiment of the present disclosure, there is provided a touch sensing method using a touch sensor that includes a first sensor and a plurality of second sensors disposed on a substrate, the method including computing an angle coordinate of a touch from a signal sensed by the plurality of second sensors; computing a time difference between the touch is sensed by the second sensors and the touch is sensed by the first sensor; computing a distance coordinate of the touch using the time difference; and obtaining a location of the touch by combining the angle coordinate and the distance coordinate.

Further, the touch sensing method may further include computing an intensity of force of the touch using a signal sensed by the first sensor.

Further, the computing an intensity of force of the touch may include compensating the signal sensed by the first sensor using the distance coordinate.

Further, the computing the time difference may include computing a time when the touch is sensed by the second sensor and a time when the touch is sensed by the first sensor.

Further, the distance coordinate may be computed by the time difference and a velocity of a wave on the substrate.

Further, touches being input into any one of the plurality of second sensors may be determined as having a same angle coordinate.

Further, the first sensor may be a force sensing sensor, and the plurality of second sensors may be capacitive sensors.

According to another embodiment of the present disclosure, there is provided a display device for controlling a vehicle connected via a network, the device including a display that displays an image through an image display area that includes a first area; and a touch sensor for detecting a touch being input into the first area, wherein the display displays a user interface (GUI) for controlling the vehicle on the first area, in a manual driving mode.

Further, the GUI for controlling vehicle may include a deceleration control object and an acceleration control object for adjusting a velocity of the vehicle; a plurality of steering control objects for controlling a steering direction of the vehicle; and a plurality of gear control objects for controlling a gear of the vehicle.

Further, the acceleration control object may be disposed at a right side of the deceleration control object.

Further, the steering control objects may be disposed to surround the deceleration control object and the acceleration control object.

Further, the gear control objects may be disposed at a right side of the deceleration control object, the acceleration control object and the steering control objects.

Further, the display device may enter the manual driving mode in response to a mode change signal transmitted from the vehicle.

Further, the display device may further include a sound outputter that generates a warning sound when entering the manual driving mode.

Further, the display device may further include a haptic module that provides a haptic effect when entering the manual driving mode.

Further, the image display area may further include a second area, and the display may display images surrounding the vehicle on the second area, in the manual driving mode.

Further, the touch sensor may include a deceleration touch sensor for sensing a touch being input into the deceleration control object; an acceleration touch sensor for sensing a touch being input into the acceleration control object; a steering touch sensor for sensing a touch being input into the steering control objects; and a gear touch sensor for sensing a touch being input into the gear control object.

Further, the deceleration touch sensor and the acceleration touch sensor may be force sensors capable of sensing the force of the touch.

Further, the steering touch sensor and the gear touch sensor may be capacitive touch sensors.

According to another embodiment of the present disclosure, there is provided a vehicle control method using a display device, the method including entering a manual driving mode during an autonomous driving of the vehicle; displaying, by the display device, a graphic user interface (GUI) for controlling the vehicle on a first area when the vehicle enters the manual driving mode; and controlling driving of the vehicle in response to a touch being input into the GUI for controlling the vehicle.

Further, the vehicle control method may further include generating, by the display device, a warning sound when the vehicle enters the manual driving mode.

Further, the vehicle control method may further include providing, by the display device, a haptic effect when the vehicle enters the manual driving mode.

Further, the GUI for controlling the vehicle may include a deceleration control object and an acceleration control object for adjusting a velocity of the vehicle; a plurality of steering control objects for adjusting a steering direction of the vehicle; and a plurality of gear control objects for adjusting a gear of the vehicle.

Further, the acceleration control object may be disposed at a right side of the deceleration control object.

Further, the steering control objects may be disposed to surround the deceleration control object and the acceleration control object.

Further, the gear control object may be disposed at a right side of the deceleration control object, the acceleration control object and the steering control objects.

Further, the displaying, by the display device, a graphic user interface (GUI) for controlling the vehicle on a first area may include displaying images surrounding the vehicle on a second area.

According to an embodiment of the present disclosure, it is possible to provide a touch sensor optimized to a circular form.

Further, according to an embodiment of the present disclosure, it is possible to complexly identify a touched point and an intensity of the touch using a sensor arranged in a simple structure.

Further, according to an embodiment of the present disclosure, it is possible to realize a touch sensor with only a small number of sensors and wires.

Further, according to an embodiment of the present disclosure, it is possible to reduce dead space.

Further, according to an embodiment of the present disclosure, it is possible to provide a high touch resolution.

BRIEF DESCRIPTION OF THE DRAWINGS

Example embodiments are described hereinafter with reference to the accompanying drawings. However, the present system and method may be embodied in different forms and are not limited to the embodiments set forth herein. Rather, these embodiments are provided as examples to facilitate the understanding of the present teachings by those of ordinary skill in the art.

In the drawings, the dimensions of the figures may be exaggerated for clarity of illustration. When an element is referred to as being "between" two elements, the element may be the only element present between the two elements, or one or more intervening elements may also be present. Like reference numerals refer to like elements throughout.

DETAILED DESCRIPTION

Figure 1:
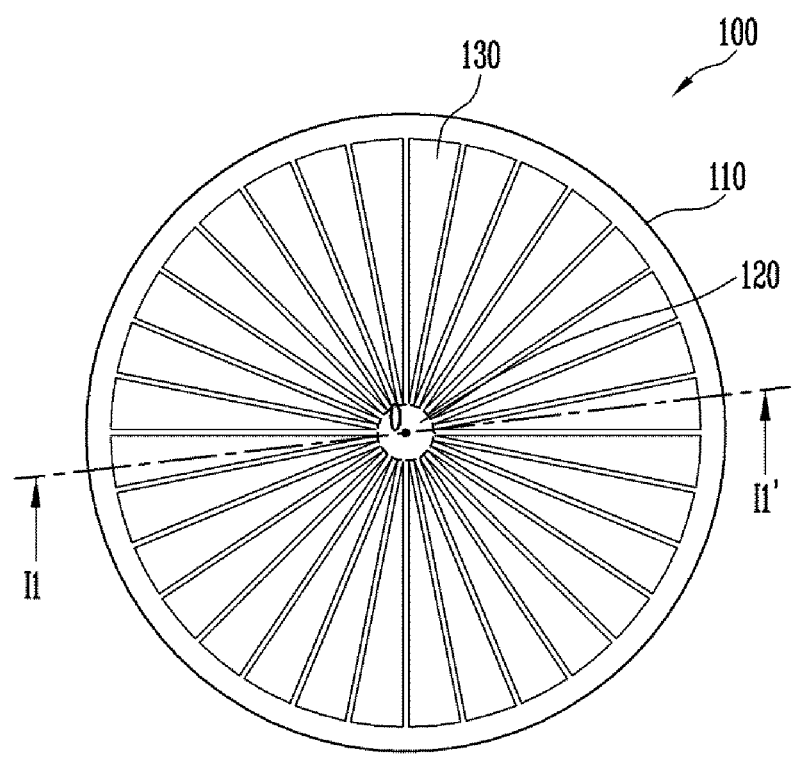
FIG. 1 is a view illustrating a touch sensor according to an embodiment of the present disclosure.

Although only certain exemplary embodiments of the present system and method are shown and described herein for purposes of illustration, those of ordinary skill in the art would understand that the described embodiments may be modified in various different ways without departing from the spirit or scope of the present system and method. Accordingly, the drawings and description are illustrative in nature and not restrictive. When an element is referred to as being "connected to" another element, it may be directly connected to the other element, or it may be indirectly connected to the other element through one or more intervening elements. Hereinafter, like reference numerals refer to like elements. In the drawings, the thickness or size of layers may be exaggerated for clarity and not necessarily drawn to scale. In the drawings, lengths and sizes of layers and regions may be exaggerated for clarity. Like reference numerals in the drawings denote like elements.

Hereinafter, a touch sensor and a method for sensing a touch using the same according to an embodiment of the present disclosure will be explained with reference to the drawings.

Figure 2:
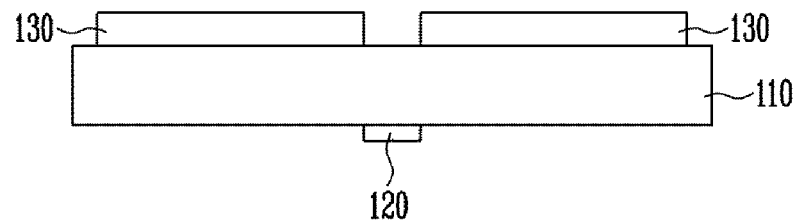
FIG. 2 is a view illustrating a cross-section taken on line I1-I1' of FIG. 1.

Configuration of a Touch Sensor According to an Embodiment of the Present Disclosure FIG. 1 is a view illustrating a touch sensor according to an embodiment of the present disclosure, and FIG. 2 is a cross-section taken on line I1-I1' of FIG. 1.

Referring to FIGS. 1 and 2, a touch sensor 100 according to an embodiment of the present disclosure may be configured to include a substrate 110, a first sensor 120 and a plurality of second sensors 130.

The substrate 110 may be formed in a circular shape having a certain radius.

The substrate 110 may be made of an insulating material such as glass and resin, etc. Further, the substrate 110 may be made of a material having flexibility such that it may be bent or folded, and may have a single-layered structure or a multiple-layered structure.

For example, the substrate 110 may include at least one of polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose and cellulose acetate propionate. However, the material constituting the substrate 110 may vary, and thus the substrate 110 may be made of fiber reinforced plastic (FRP) or the like as well.

The first sensor 120 may be located on one surface of the substrate, for example, in a central area of the substrate 110. More specifically, the first sensor 120 may be located in a center 0 of the substrate 110.

The first sensor 120 may be a sensor that senses an intensity of a force being applied to the touch sensor 100.

Types and operation methods of the first sensor 120 will be explained in detail hereinafter with reference to FIGS. 14 to 16B.

The plurality of second sensors 130 may be located on a surface opposite to the one surface of the substrate 110 where the first sensor 120 is located. Otherwise, the plurality of second sensors 130 and the first sensor 120 may be located on a same surface of the substrate 110.

As illustrated in FIG. 1, each of the plurality of second sensors 130 may be formed in a fan shape having a certain central angle and a radius, in an isosceles triangle shape having a certain vertical angle, or in a shape similar to the aforementioned fan shape or the isosceles triangle shape having a vertex and a width of the second sensors 130 increases as a distance from the vertex increases.

Further, the plurality of second sensors 130 may be sectors of a circle such that arcs of the circle form a circular shape having a predetermined space between adjacent sectors. That is, the plurality of second sensors 130 may be arranged such that their vertices surround the central area of the substrate 110, and that their arcs of the circle (or edges) correspond to the circumference of the substrate 110. The vertices of the sectors are formed away from the central area of the circle in which the first sensor 120 is formed.

Meanwhile, although the substrate 110 in FIG. 1 is assumed as having a circular shape, there is no limitation thereto, and thus the shape of the substrate 110 may vary.

Each of the plurality of second sensors 130 is a capacitive touch sensor which senses an amount of change of a capacitance to detect touch positions, and thus contains a conductive material. For example, the conductive material constituting the second sensors 130 may contain metal or an alloy thereof. Examples of the metal include gold (Au), silver (Ag), aluminum (Al), molybdenum (Mo), chrome (Cr), titanium (Ti), nickel (Ni), neodymium (Nd), copper (Cu) and platinum (Pt), etc.

Otherwise, the conductive material may be made of a transparent conductive material. Examples of the transparent conductive material include silver nano wire (AgNW), indium tin oxide (ITO), indium zinc oxide (IZO), antimony zinc oxide (AZO), indium tin zinc oxide (ITZO), zinc oxide (ZnO), tin oxide ($SnO_2$), carbon nano tube and graphene, etc.

Figure 3:
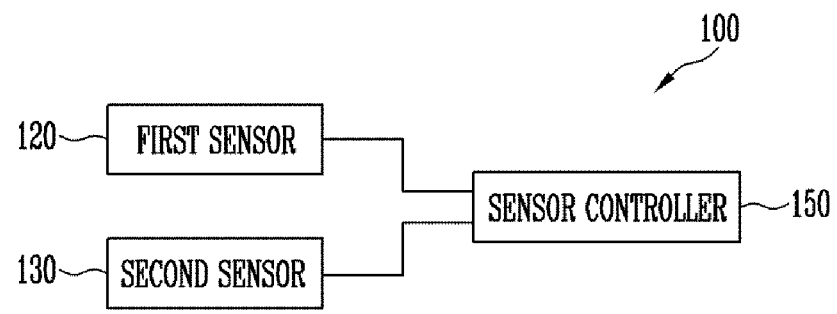
FIG. 3 is a block diagram schematically illustrating a touch sensor that includes a sensor controller according to an embodiment of the present disclosure.

FIG. 3 is a block diagram schematically illustrating a touch sensor that includes a sensor controller according to an embodiment of the present disclosure.

Referring to FIG. 3, the touch sensor 100 according to the embodiment of the present disclosure may further include the sensor controller 150.

The sensor controller 150 may obtain signals sensed by the first sensor 120 and the second sensor 130, and detect a location of a touch applied to the touch sensor 100 and an intensity of the force of the touch, etc.

For this purpose, the sensor controller 150 may communicate with the first sensor 120 and the plurality of second sensors 130.

Meanwhile, although in FIG. 3 it is assumed, for convenience of explanation, that the signal sensed by the first sensor 120 and the signal sensed by the second sensor 130 are processed in the same sensor controller 150, there is no limitation thereto. For example, the sensor controller for processing the signal being output from the first sensor 120 and the sensor controller for processing the signal being output from the second sensor 130 may be provided separately from each other.

Figure 4A:
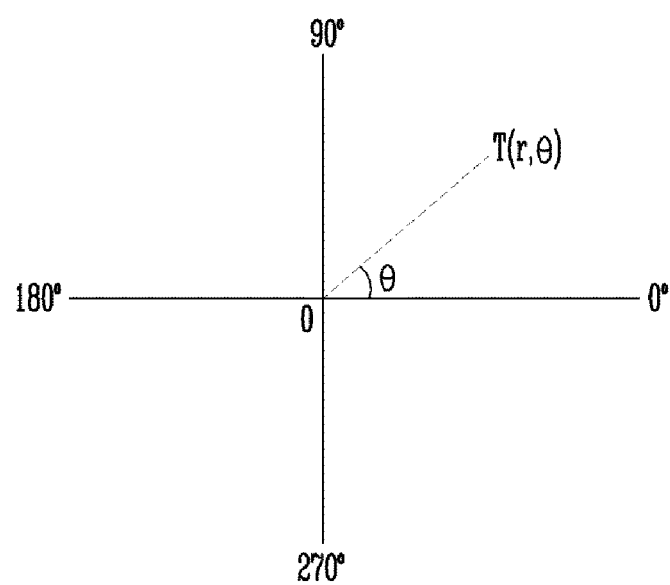
FIGS. 4A, 4B and 4C are views provided to explain operations for detecting a touch location using the touch sensor illustrated in FIGS. 1 and 2.
Figure 4B:
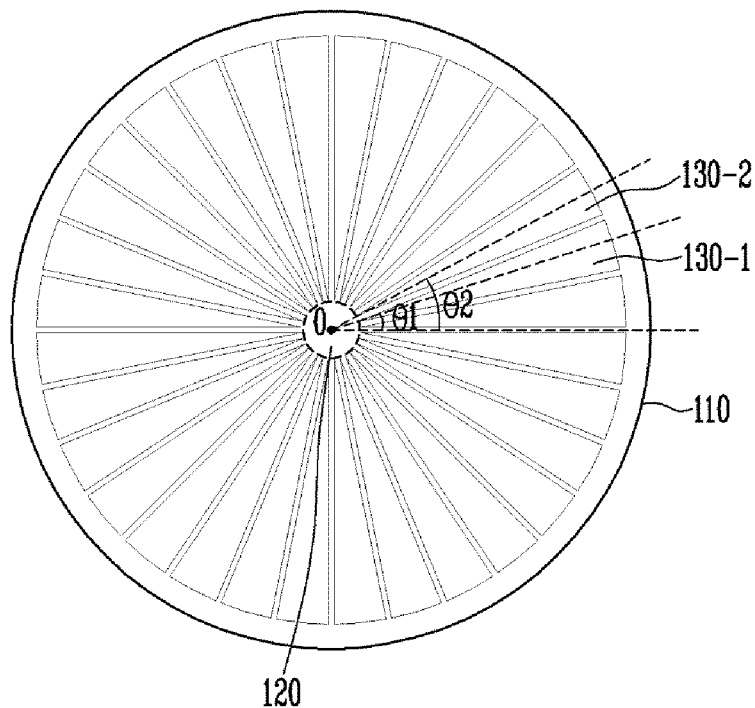
Figure 4C:
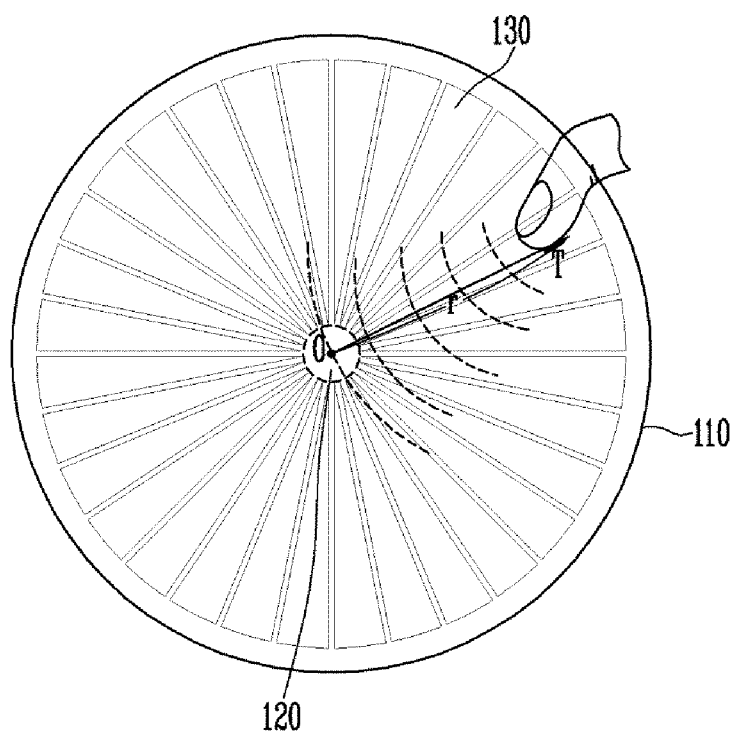

FIGS. 4A to 4C are views provided to explain operations of detecting a touch location using the touch sensor illustrated in FIGS. 1 to 3.

As aforementioned, the touch sensor 100 according to the present disclosure includes both the first sensor 120 for sensing an intensity of the force of a touch and the second sensor 130 for sensing locations of touch, and thus the sensor controller 150 may compute a touch location and the force of the touch with reference to the signal sensed by the first sensor 120 and the signal sensed by the second sensor 130.

According to the present disclosure, as illustrated in FIG. 4A, it is possible to compute a touch location using a polar coordinate.

More specifically, assuming a coordinate of a touch location is T(r, θ), it is possible to obtain an angle coordinate (θ) of the touch location from the signal sensed by the plurality of second sensors 130, and obtain a distance coordinate (r) of the touch location with reference to both the signal sensed by the plurality of second sensors 130 and the signal sensed by the first sensor 120.

Referring to FIG. 4B, the angle coordinate (θ) may be determined depending on the electrode among the plurality of second electrodes 130 from which the touch signal is input.

For example, when the second sensor corresponding to reference numeral 130-1 senses a touch input, the angle coordinate (θ) of the touch location may be θ1, and when the second sensor corresponding to reference numeral 130-2 senses a touch input, the angle coordinate of the touch location may be θ2.

That is, regardless of how far from the center 0 of the substrate 110 the touch was input, touches input into the same second sensor 130-1 have the same angle coordinate θ1.

In order to obtain the angle coordinate of a touch input as aforementioned, in a certain storage device (not illustrated), a number designated to each of the plurality of second sensors 130 and an angle coordinate value corresponding thereto may be mapped and stored in a memory device.

Then, unlike the second sensors 130 for sensing a location of the touch signal, the first sensor 120 senses a bending wave that occurred as a finger or the like makes a contact as a touch signal.

That is, as illustrated in FIG. 4C, it may take a certain time Δt for a bending wave occurred by a touch input reaches the first sensor 120, and the certain time Δt may be expressed as in math equation 1 below.

$$\Delta t = t2 - t1 \qquad \text{[math equation 1]}$$

(t1 being the time point when the second sensor 130 senses the touch input, and t2 being the time point when the first sensor 120 senses the touch input)

Meanwhile, if the medium is the same, the bending wave always proceeds at a certain velocity regardless of its amplitude (that is, regardless of the intensity of the touch force).

Therefore, the distance r, the distance the wave travels until the first sensor 120 senses the bending wave occurred by the touch input, may be expressed as in math equation 2 below.

$$r = v \times \Delta t \qquad \text{[math equation 2]}$$

(v being the velocity of the wave corresponding to the substrate, and Δt being computed by math equation 1 above and being the time it takes for the first sensor 120 to sense the wave caused by the touch input after the touch input is made)

According to the present disclosure, since the first sensor 120 is located in the center 0 of the substrate 110, r may be the distance coordinate of the touch location.

That is, when information on the time difference between the first sensor 120 sensed the touch input and the second sensor 130 sensed the touch input is obtained, it is possible to compute the distance coordinate r of the touch location based on [math equation 1] and [math equation 2].

Meanwhile, the velocity of the wave v may differ depending on the type of the substrate.

When the angle coordinate θ and the distance coordinate r of the touch location are obtained according to the aforementioned method, it is possible to specify the touch location T(r, θ) as the final coordinate.

After determining the touch location T(r, θ), it is possible to compute the intensity of the force applied by the touch from the signal sensed by the first sensor 120.

However, according to the present disclosure, since the first sensor 120 is not disposed in plural locations on the substrate 110, but instead located only in the center of the substrate 110, intensity of the wave generated by the touch input decreases as the distance r increases.

Further, the farther the distance between the touched location and the first sensor 120, the greater the ratio by which the force intensity decreases.

Therefore, in order to compute the exact intensity of the force generated by a touch input, the decreased amount of wave must be compensated depending on the distance r. Here, the farther the distance between the touch location and the first sensor 120, the greater the compensation value (or compensation ratio).

The intensity of a force by a touch input may be compensated for according to [math equation 3] below.

$$Fc = Fs \times (1 + a \times r^b) \qquad \text{[math equation 3]}$$

(Fc being the intensity of the force after the compensation, Fs being the intensity of the force sensed by the first sensor 120, r being the distance between the touch input location and the first sensor 120, and a and b being arbitrary constant numbers).

In this case, a and b may differ depending on the type of the medium, that is, the substrate.

Further, the distance r between the touch input location and the first sensor 120 may a value computed by the aforementioned [math equation 1] and [math equation 2].

Figure 5A:
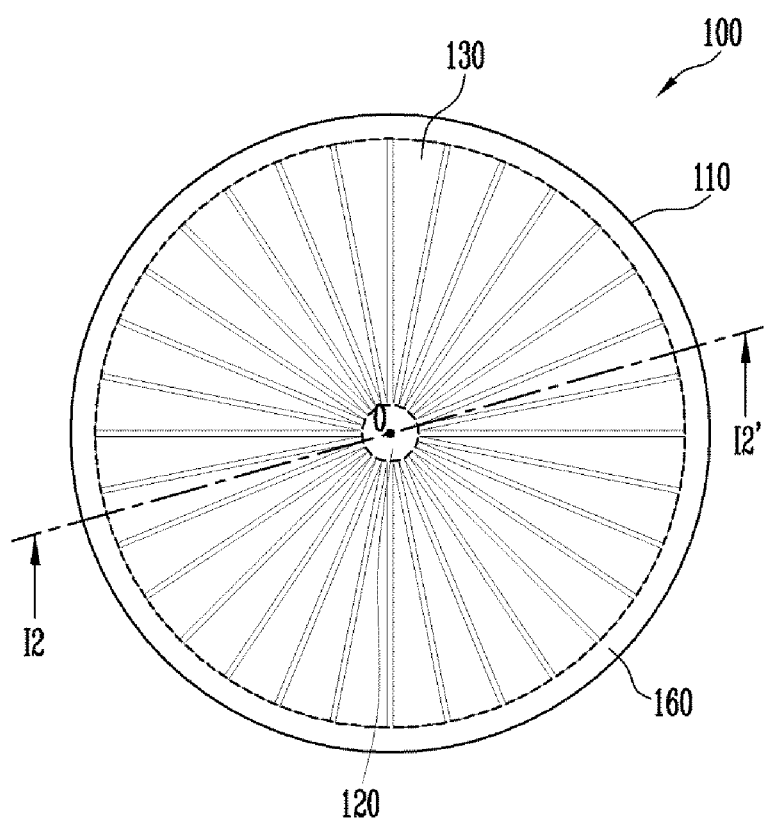
FIG. 5A is a view illustrating a touch sensor that includes a buffer member according to an embodiment of the present disclosure.
Figure 5B:
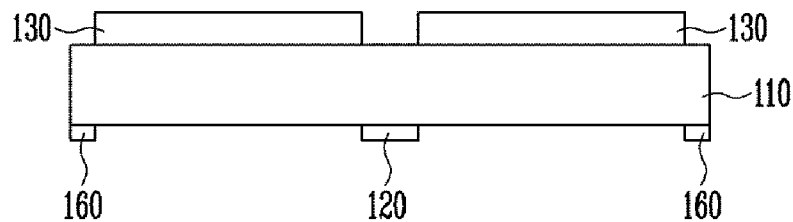
FIG. 5B is a view illustrating a cross-section taken on line I2-I2' of FIG. 5A.

FIG. 5A is a view illustrating a touch sensor that includes a buffer member according to an embodiment of the present disclosure, and FIG. 5B is a view illustrating a cross-section taken on line I2-I2' of FIG. 5A.

Referring to FIGS. 5A and 5B, the touch sensor 100 according to the embodiment of the present disclosure may further include the buffer member 160.

The buffer member 160 may be provided on the substrate 110 on the same surface as the first sensor 120 is provided. Further, the buffer member 160 may be spaced apart from the first sensor 120 and surrounds the first sensor 120. For example, the buffer member 160 may be formed along a circumference of the one surface of the substrate 110.

The buffer member 160 may maintain a uniform height of the second sensor 130 and alleviate external impact, thereby performing a function of protecting the first sensor 120.

For this purpose, the buffer member 160 may have elasticity. For example, the buffer member 160 may have elasticity such that it may be transformed by a force from outside and be restored back to its original state once the force is removed.

Further, a height of the buffer member 160 may be the same or greater than the height of the first sensor 120 so as to protect the first sensor 120 from external force.

The buffer member 160 may be provided as a porous polymer so that it has elasticity. For example, the buffer member 160 may be foam such as sponge.

For example, the buffer member 160 may include thermoplastic elastomer, polystyrene, polyolefin, polyurethane thermoplastic elastomers, polyamides, synthetic rubbers, polydimethylsiloxane, polybutadiene, polyisobutylene, poly(styrene-butadienestyrene), polyurethanes, polychloroprene, polyethylene, or silicone, or a combination thereof, but there is no limitation thereto.

In FIGS. 5A and 5B, it is illustrated, for convenience of explanation, that the buffer member 160 has a circular band shape formed along an entirety of the circumference of the substrate 110, but there is no limitation thereto. That is, the buffer member 160 may be provided in only at least a portion of the circumference of the substrate 110 as long as it can compensate for the difference in height of the second sensor 130 generated as the first sensor 120 is arranged on a lower portion of the substrate 110 and support the substrate 110.

Figure 6:
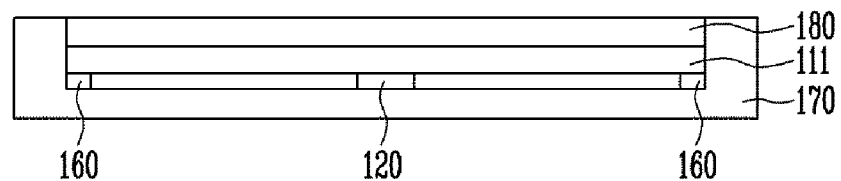
FIG. 6 is a view illustrating a touch-sensor-integrated type display device that includes a touch sensor according to an embodiment of the present disclosure.

FIG. 6 is a view illustrating a touch-sensor-integrated display device that includes a touch sensor according to an embodiment of the present disclosure.

Referring to FIG. 6, the touch-sensor-integrated display device according to the embodiment of the present disclosure includes a bracket 170, a display panel 111 accommodated inside the bracket 170, the first sensor 120, the buffer member 160 and a window 180.

FIG. 6 exemplifies a touch-sensor-integrated display device where a plurality of second sensors 130 are integrated into the display panel 111 and the first sensor 120 is disposed on the lower portion of the display panel 111.

However, there is no limitation thereto, and thus the location of the sensor may vary of course. For example, as explained with reference to FIGS. 1 to 5B, the sensors 120, 130 may be realized to have a separate substrate 110 as the medium, or as illustrated in FIG. 6, the second sensor 130 may be integrated into the display panel 111.

Otherwise, changes may be made such that the second sensors 130 are integrated into the window 180. For example, the second sensors 130 may be formed on a lower surface of the window 180.

That is, in the touch-sensor-integrated display device, the location of the first and second sensor 120, 130 and the element being integrated with the sensors may vary.

Meanwhile, although not illustrated in FIG. 6, the display device may further include a polarizing plate and adhesive, etc.

Figure 7:
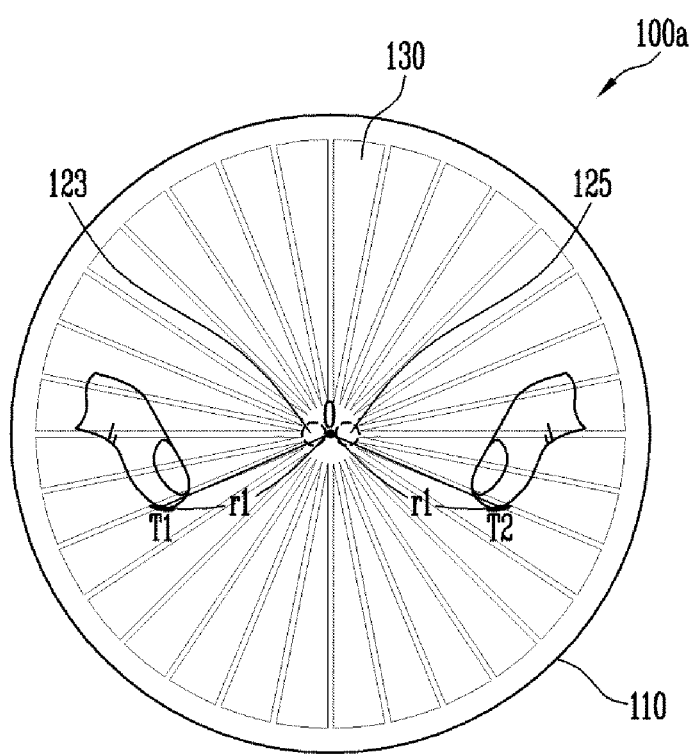
FIG. 7 is a view illustrating a touch sensor according to another embodiment of the present disclosure.

FIG. 7 is a view illustrating a touch sensor according to another embodiment of the present disclosure.

Referring to FIG. 7, the touch sensor 100*a* according to the another embodiment of the present disclosure may include a plurality of first sensors 123, 125.

In this case, the plurality of first sensors 123, 125 may be disposed in the central area of the substrate 110, and the plurality of second sensors 130 may be arranged to surround the central area.

In the embodiment illustrated in FIG. 1 and FIG. 2, the center of the first sensor 120 is arranged to correspond to the center 0 of the substrate 110.

However, in the another embodiment of the present disclosure illustrated in FIG. 7, at least one of the plurality of first sensors 123, 125 may be spaced apart from the center 0 of the substrate 110 by a certain distance.

Not only a single touch but also multiple touches T1, T2 may be input simultaneously into the touch sensor 100*a*, and the multiple touches T1, T2 may be input to locations having different angle coordinates but a same distance coordinate r1.

Here, it takes a same amount of time for the waves generated from the multiple touches to arrive at the center of the substrate, and thus, according to the embodiment illustrated in FIG. 1 and FIG. 2, the first sensor 120 senses the waves simultaneously.

That is, the first sensor 120 may not be able to sense the waves as signals generated by different touches but as one signal, and thus the first sensor 120 may not compute the exact location of the touch input.

In the another embodiment of the present disclosure illustrated in FIG. 7, at least one of the plurality of first sensors 123, 125 is provided in a location not corresponding to the center 0 of the substrate.

Therefore, even when the multiple touches T1, T2 are input simultaneously into a location that is away from the center 0 of the substrate 110 by a same distance r, the distances between the first sensors 123, 125 and each of the multiple touches T1, T2 are different. That is, the first sensors 123, 125 may sense the touch input at different time points.

Meanwhile, FIG. 7 exemplifies the touch sensor 100*a* according to the other embodiment where two first sensors 123, 125 are arranged, but there is no limitation thereto. That is, the number of the first sensors 123, 125 may vary.

Figure 8:
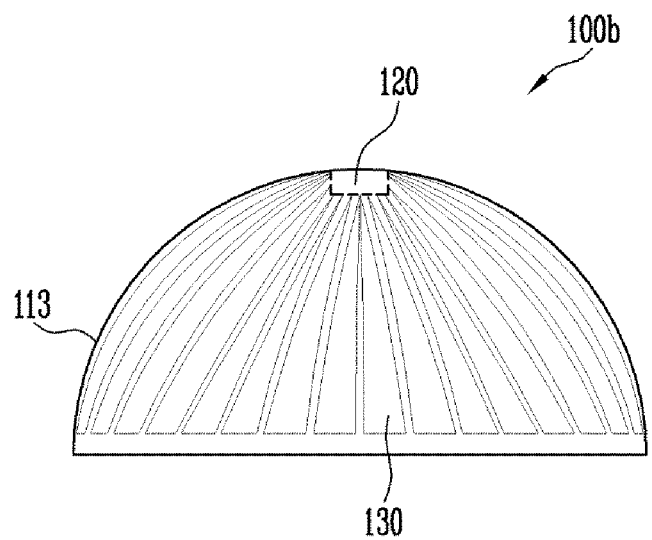
FIGS. 8 and 9 are views illustrating a touch sensor according to another embodiment of the present disclosure.
Figure 9:
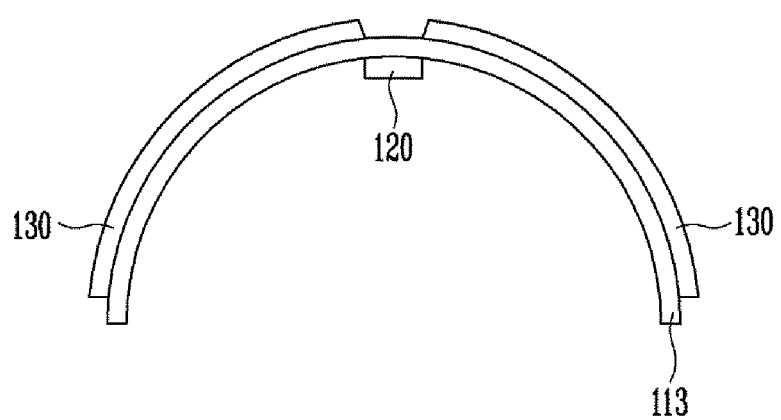

FIG. 8 is a view illustrating a touch sensor according to anther embodiment of the present disclosure, and FIG. 9 is a view illustrating a cross-section of the touch sensor illustrated in FIG. 8.

In the embodiment explained with reference to FIGS. 1 to 7, the substrate 110 of the touch sensor is a circular shape.

Meanwhile, the substrate 113 of the touch sensor according to the other embodiment of the present disclosure may have a dome shape as illustrated in FIG. 8, and therefore, the cross-section of the substrate 113 may have an arch shape as illustrated in FIG. 9.

The first sensor 120 may be disposed inside the dome-shaped substrate 113. More specifically, assuming the point with the highest level in the substrate 113 is the center of the substrate 113, the first sensor 120 may be provided in a location corresponding to the center.

Then, the plurality of second sensors 130 may be disposed on an outer surface of the substrate 113, and may be arranged to surround the central area of the substrate 113 on which the first sensor 120 is provided.

Further, as illustrated in FIG. 8, each of the plurality of second sensors 130 may have a shape where a width of the second sensors 130 increases as a distance from the first sensor 120 increases.

Figure 10:
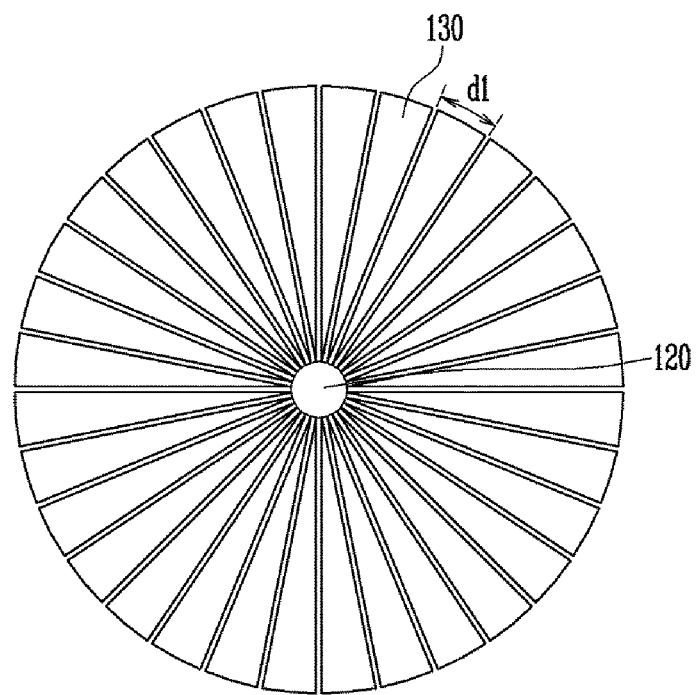
FIGS. 10 and 11 are views provided to compare the number of sensors provided in a circular-type substrate in a case where an embodiment of the present disclosure is applied, and the number of sensors provided in a circular-type substrate in a case where prior art is applied.
Figure 11:
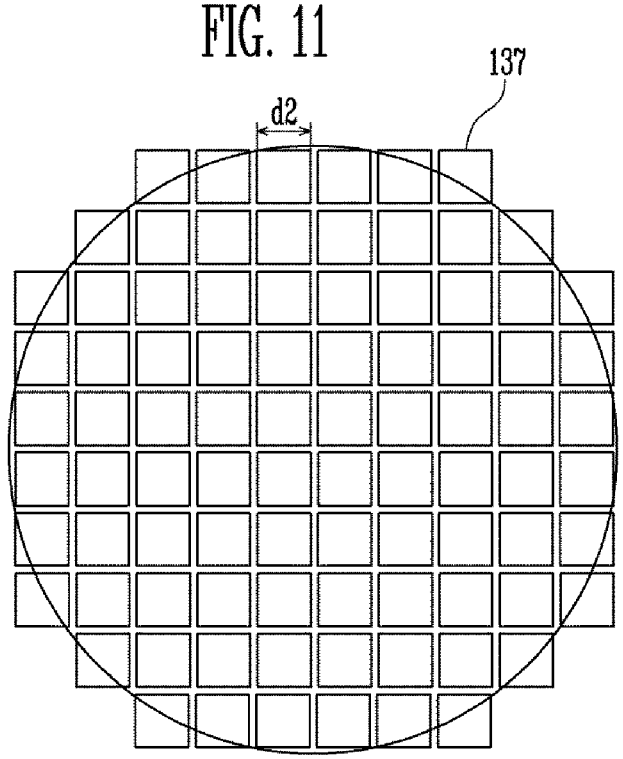

FIGS. 10 and 11 are views provided to compare and explain the number the sensors provided on a circular substrate in the case where an embodiment of the present disclosure is applied and the number of sensors provided on a circular substrate in the case where conventional method is applied.

Referring FIG. 10 and FIG. 11, explanation will be made based on an assumption that an activation area where a touch may actually be input has a circular shape with a radius of 20 mm, and therefore, a circumference of the activation area is $40\pi$ mm.

FIG. 10 is a view exemplifying the number of sensors provided on the circular substrate in the case where an embodiment of the present disclosure is applied.

Referring to FIG. 10, explanation will be made based on an example that the second sensor 130 arranged on the substrate has a fan shape having an arc length d1 of 3.925 mm.

In this case, thirty-two second sensors 130 may be arranged on the substrate.

Although not illustrated in FIG. 10, to each of the plurality of second sensors 130, a line for outputting and transmitting a sensed signal to the sensor controller is connected, and since the number of the second sensors 130 in FIG. 10 is thirty two, the number of lines necessary is also thirty two.

Further, since the second sensors 130 are arranged in a circular form, no connection line in the activation area is required.

FIG. 11 is a view exemplifying the number of sensors provided on a circular substrate in the case where prior art is applied.

In order to compare these touch sensors objectively with the touch sensor illustrated in FIG. 10, explanation will be made based on an assumption that the sensors 137 of FIG. 11 are arranged in an activation area having the same size as that of the FIG. 10.

Further, explanation will be made based on an assumption that, of the conventional methods for sensing an amount of change of a capacitance, the prior art used herein is a self-capacitive type touch sensor.

Further, it is assumed that the length d2 of each side of the sensor 137 of the prior art is 4 mm, that is, similar to the arc length d1 of the second sensor 130 illustrated in FIG. 10

Referring to FIG. 11, in order to realize an activation area having a radius of 20 mm, eighty eight sensors 137 are needed, and therefore, the number of lines needed to be connected to each sensor 137 is eighty eight as well.

That is, compared to the touch sensor illustrated in FIG. 10, 2.75 times or more lines must be provided in the capacitive type touch sensor.

Further, the lines are provided within the activation area, and thus the lines have a lower signal to noise ratio (SNR) compared to the lines according to the present disclosure, and further, since the sensor 137 is provided in areas other than the activation area, dead space, that is unnecessary space, increases.

Figure 12:
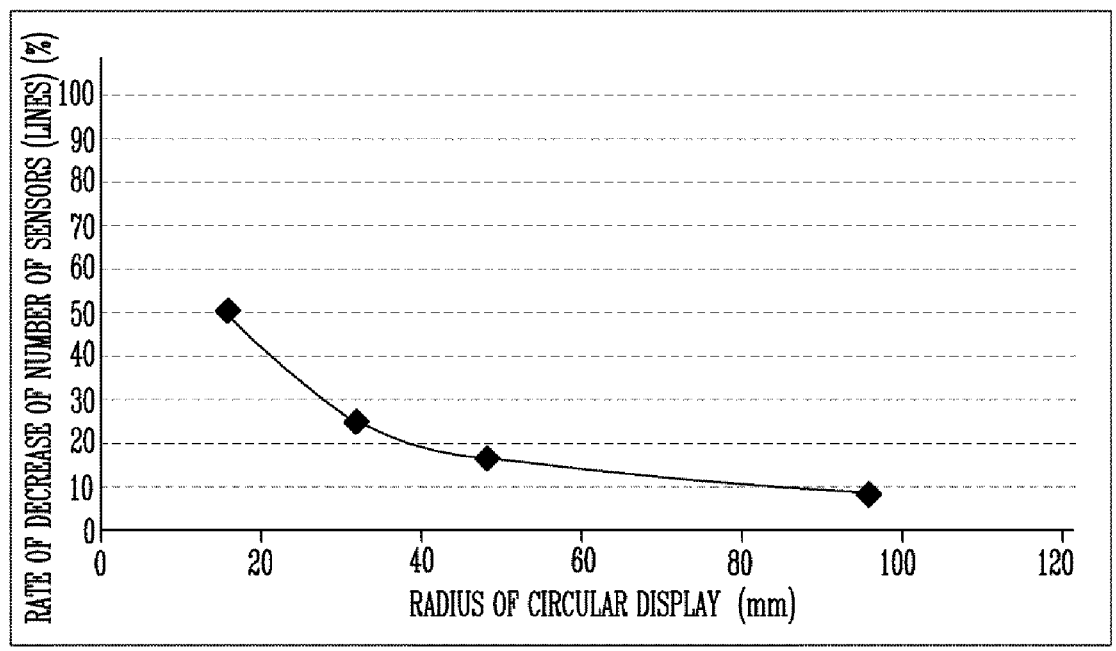
FIG. 12 is a view provided to explain the effect of reducing the number of lines according to an embodiment of the present disclosure.

FIG. 12 is a view provided to explain the effect of reducing the number of lines according to an embodiment of the present disclosure.

FIG. 12 exemplifies that the sensors are arranged on a circular substrate having a radius of R. Further, explanation will be made based on an assumption that the length of the edge of the second sensor (or the length of the arc in the case the second sensor has a fan shape) according to an embodiment of the present disclosure and the width of the self-capacitive touch sensor according to prior art are both 4 mm. That is, d1 and d2 illustrated in FIG. 10 and FIG. 11 are both 4 mm.

In this case, about $(2\pi R)/4$ number of second sensors according to the present disclosure 130 are provided on the substrate. In the case of prior art, about $\pi R^2/16$ number of self-capacitive type touch sensors 137 would be provided on the substrate.

That is, according to the embodiment of the present disclosure, the number of sensors being provided on the circular substrate is reduced by 8/R compared to the number of self-capacitive type touch sensors that would be provided according to prior art.

Further, since the number of lines necessary for the touch sensor corresponds to the number of sensors provided on the substrate as aforementioned, according to the present disclosure, there is an effect of reducing the number of lines necessary for the touch sensor by as much as 8/R as well compared to prior art.

For example, in the case where the radius of the circle is 16 mm, the number of lines is reduced to ½ compared to that of prior art, and in the case where the radius is 32 mm, the number of lines is reduced to ¼ compared to that of prior art. That is, as illustrated in FIG. 12, the greater the radius, the greater the effect of reducing the number of lines.

Meanwhile, although the comparison was made in FIGS. 10 to 11 based on an example that the prior art touch sensor is a self-capacitive type touch sensor, the prior art touch sensor may be a mutual-capacitive touch sensor instead.

However, since the mutual-capacitive touch sensor uses a driving sensor and a sensing sensor, both a layer for positioning the driving sensor and a layer for positioning the sensing sensor must be provided.

That is, in the case of realizing a touch sensor according to prior art that uses the mutual capacitive touch sensor, at least two layers are necessary, and thus the fabricating process would become more complicated than when realizing a touch sensor according to the present disclosure.

Consequently, in the case of the embodiment of the present disclosure, it is possible to provide a smaller number of sensors than in the case of prior art, and further, it is possible reduce the number of lines as well. Therefore, it is possible to simplify the manufacturing process and improve the SNR efficiency caused by the lines.

Further, shapes and arrangement of the sensors may be configured to correspond to those of the circular substrate, thereby reducing dead space as well.

Further, since the width of the second sensor disposed on the substrate is narrower when it is closer to the center of the substrate, it is possible to realize a higher touch resolution when it is closer to the center of the substrate.

Further, since waves that pass the same medium do not interfere with one another even if they are overlapped, it is possible to compute the exact location of each touch even when multiple touches are input on the touch sensor.

Hereinafter, a method for sensing a touch using a touch sensor according to the present disclosure will be explained with reference to FIG. 13.

Figure 13:
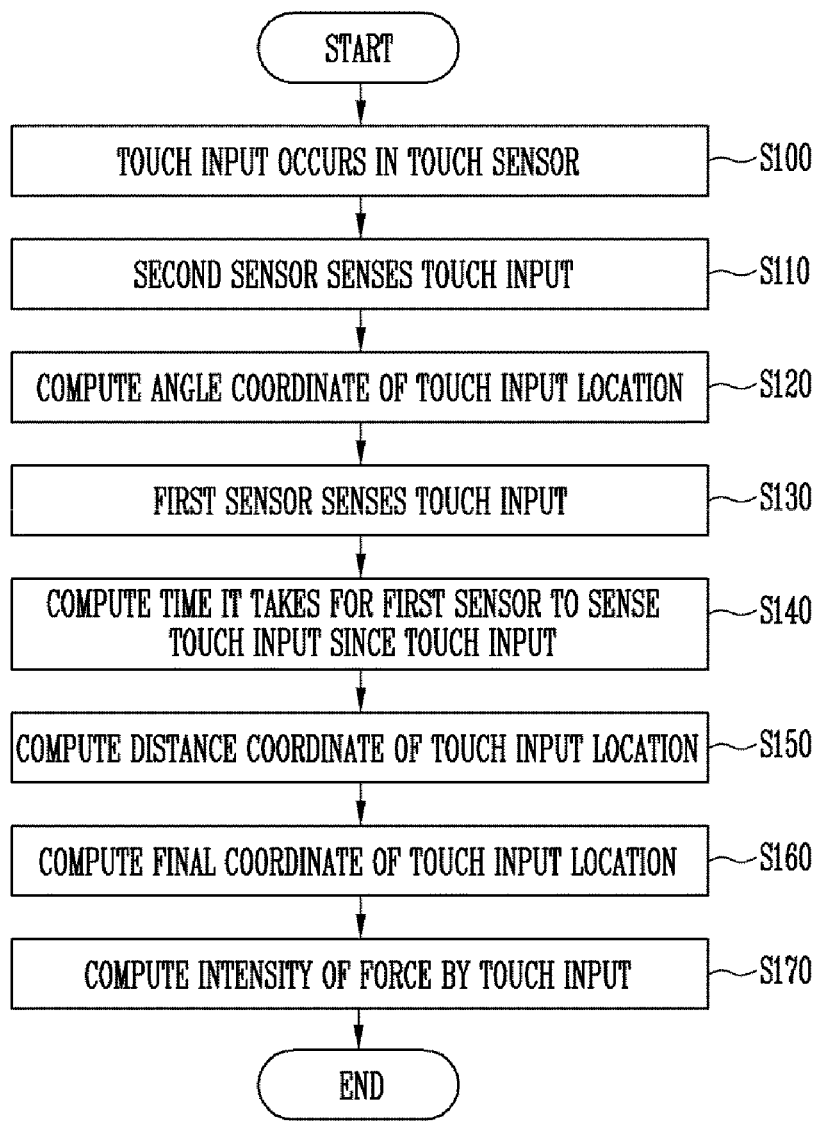
FIG. 13 is a flowchart provided to explain a method for sensing a touch according to an embodiment of the present disclosure.

FIG. 13 is a flowchart provided to explain a method for sensing a touch according to an embodiment of the present disclosure.

When a touch input occurs on the touch sensor according to the present disclosure (S100) the second sensor senses the touch (S110).

Then, with reference to the signal sensed in the second sensor, an angle coordinate of the touch is computed (S120). The method for computing the angle coordinate using the second sensor is the same as that mentioned above with reference to FIGS. 4A to 4C, and thus further explanation will be omitted.

The first sensor senses the touch (S130). When a touch is input on the touch sensor, it takes time for the wave generated by the touch to reach the first sensor located in the center of the substrate, and thus the first sensor may sense the touch later than the second sensor.

Then, a time difference between the second sensor sensed the touch and the first sensor sensed the touch is calculated (S140).

When such time is computed, a distance coordinate of the touch is computed using the wave velocity in the substrate and using the aforementioned [math equation 1] and [math equation 2] (S150).

Thereafter, a final coordinate of the touch is obtained by combining the computed angle coordinate and the distance coordinate (S160).

Then, with reference to the signal obtained from the first sensor, an intensity of the force of the touch input is computed (S170). Here, since the intensity decreases as the wave proceeds as aforementioned, the force intensity may be compensated by as much as it decreased using the distance coordinate computed above and [math equation 3].

Hereinafter, the first sensor of the present disclosure will be explained in further detail with reference to FIGS. 14 to 16B.

Figure 14:
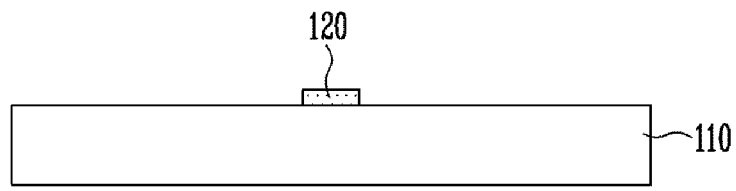
FIG. 14 is a view illustrating a first sensor according to an embodiment of the present disclosure.

FIG. 14 is a view illustrating a first sensor according to an embodiment of the present disclosure.

The first sensor is provided to perform the function of sensing the force being input into the substrate and the intensity of the force as mentioned above.

Referring to FIG. 14, the first sensor according to the embodiment of the present disclosure may be a variable resistance element.

The variable resistance element is an element of which the electrical characteristics change according to an amount of deformation. Its resistance may change in response to the force (or strength) being applied from outside.

For example, the greater the force being provided to the variable resistance element, the smaller the resistance of the variable resistance element may become. Or to the contrary, the greater the force being provided to the variable resistance element, the greater the resistance of the variable resistance element may become.

The variable resistance element may contain a material of which the resistance changes according to force applied to it. For example, the variable resistance element may contain materials called a force sensitive material or a force sensitive resistor, etc.

The variable resistance element may contain at least one of piezo-electric materials such as lead zirconate titanate (PZT) and polyvinylidene fluoride (PVDF) or the like, carbon powder, quantum tunneling composite (QTC), silicone, carbon nano tube and graphene, etc.

Further, the variable resistance element may contain nano particles. The nano particles may be provided as nano tubes, nano columns, nano loads, nano pores or nano wires, etc.

The nano particles may be particles containing carbon, graphite, metalloid, metal, a conductive oxide of metalloid or metal, or a conductive nitride of metalloid or metal; or particles of core shell structures of insulating beads coated with the particles; or a combination thereof. The metalloid may contain any one of antimony(Sb), germanium(Ge), arsenic(As), and an alloy thereof. The metal may contain zinc(Zn), aluminum(Al), scandium(Sc), chrome(Cr), manganese(Mn), iron(Fe), cobalt(Co), nickel(Ni), copper(Cu), indium(In), tin(Sn), yttrium(Y), zirconium(Zr), niobium (Nb), molybdenum(Mo), ruthenium(Ru), rhodium(Rh), palladium(Pd), gold(Au), silver(Ag), platinum(Pt), strontium (Sr), tungsten(W), cadmium(Cd), tantalum(Ta), titanium(Ti) or an alloy thereof. The conductive oxide may contain indium-tin-oxide (ITO), indium-zinc-oxide(IZO), zinc oxide doped with aluminum (AZO), gallium-indium-zinc-oxide (GIZO), zinc oxide (ZnO), or a mixed compound thereof.

In an embodiment of the present disclosure, the nano particle may be at least one of carbon nano tube, graphene and silver nano wire, but there is no limitation thereto.

Further, the shape of the variable resistance element is not limited to that illustrated in FIG. 14, and may thus vary.

Figure 15A:
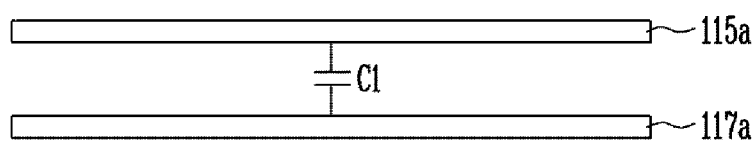
FIGS. 15A and 15B are views provided to explain a first sensor and an operation method thereof according to another embodiment of the present disclosure.
Figure 15B:
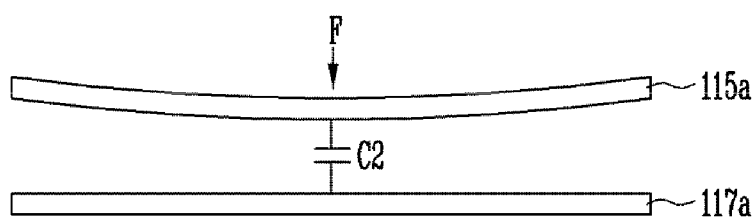

FIGS. 15A and 15B are views provided to explain a first sensor and a method for operating the same according to another embodiment of the present disclosure.

Referring to FIG. 15A, the first sensor according to the present disclosure may include a first conductor 115a and a second conductor 117a.

The first conductor 115a and the second conductor 117a may be disposed to be spaced apart from each other.

Further, there may be an additional element disposed between the first conductor 115a and the second conductor 117a.

The first conductor 115a and the second conductor 117a contain a conductive material. In an embodiment of the present disclosure, the conductive material may be metal or an alloy of metal.

Examples of the metal include gold (Au), silver (Ag), aluminum (Al), molybdenum (Mo), chrome (Cr), titanium (Ti), nickel (Ni), neodymium (Nd), copper (Cu) and platinum (Pt), etc.

In an embodiment of the present disclosure, the first conductor 115a and the second conductor 117a may be made of a transparent conductive material. Examples of the transparent conductive material include silver nano wire (AgNW), indium tin oxide (ITO), indium zinc oxide (IZO), antimony zinc oxide (AZO), indium tin zinc oxide (ITZO), zinc oxide (ZnO), tin oxide ($SnO_2$), carbon nano tube and graphene, etc. The first conductor 115a and the second conductor 117a may be made of a single layer or multiple layers. For example, the first conductor 115a and the second conductor 117a may include multiple layers where two or more of the aforementioned materials are laminated.

Although the first conductor 115a and the second conductor 117a are illustrated to have plate shapes in the drawings, there is no limitation thereto, and thus their shapes may vary.

Further, the second conductor 117a may be made of a same material as or a different material from the first conductor 115a.

Meanwhile, FIG. 15A illustrates a state where a force F is not applied to the first sensor, and FIG. 15B illustrates a state where a force F is applied to the first sensor.

Referring to FIG. 15A, in the case where a force F is not applied to the first sensor, a first capacitance C1 is formed between the first conductor 115a and the second conductor 117a.

Referring to FIG. 15B, in the case where the force F is applied to the first sensor by a user's touch or the like, the distance between the first conductor 115a and the second conductor 117a is changed, and accordingly, the capacitance of the first conductor 115a and the second conductor 117a may have different value. For example, the first capacitance C1 may change to a second capacitance C2 by the force F applied.

Consequently, the mutual capacitance of the first conductor 115a and the second conductor 117a change in response to the force F being applied from outside.

Figure 16A:
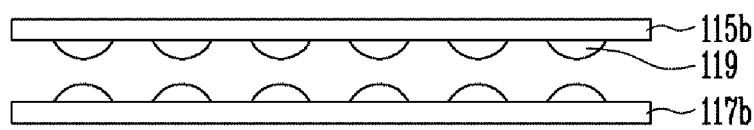
FIGS. 16A and 16B are views provided to explain a first sensor and an operation method thereof according to another embodiment of the present disclosure.
Figure 16B:
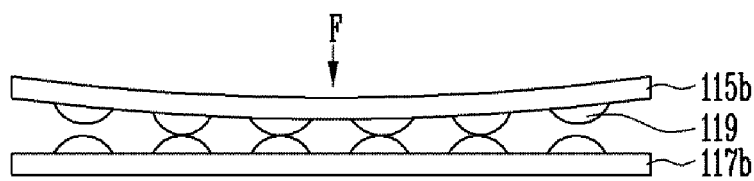

FIGS. 16A and 16B are views provided to explain a first sensor and a method for operating the same according to another embodiment of the present disclosure.

Referring to FIG. 16A, the first sensor according to the present disclosure may include a first substrate 115b and a second substrate 117b.

The first substrate 115b and the second substrate 117b may be disposed to be spaced apart from each other.

Further, in each of the first substrate 115b and the second substrate 117b, a plurality of projections 119 may be formed.

The first substrate 115b and the second substrate 117b may be arranged such that the projections 119 formed on the first substrate 115b and the projections 119 formed on the second substrate 117b face each other. Further, each of the projections 119 formed on the first substrate 115b may be provided in a location corresponding to each of the projections 119 formed on the second substrate 117b.

The projections 119 contain a conductive material. In an embodiment of the present disclosure, the conductive material forming the projections 119 may contain metal or an alloy of metal. Examples of the metal or the alloy of metal that may be used herein are the same as aforementioned material, and thus further explanation will be omitted.

Meanwhile, although the projection 119 is illustrated in a shape as if an elliptical portion is removed, there is no limitation thereto, and thus the shape of the projection 119 may vary.

Meanwhile, FIG. 16A illustrates a state where a force F is not applied to the first sensor, and FIG. 16B illustrates a state where a force F is applied to the first sensor.

Referring to FIG. 16A, in the case where a force F is not applied to the first sensor, the projections 119 formed on the first substrate 115b and the projections 119 formed on the second substrate 117b are spaced apart from each other.

Referring to FIG. 16B, in the case where a force F is applied to the first sensor by a user's touch or the like, the distance between the first substrate 115b and the second substrate 117b changes, and accordingly, a portion of the projections 119 formed on the first substrate 115b and the projections 119 formed on the second substrate 117b contact each other.

Here, the greater the intensity of the force F, the greater the surface area of contact between the projections formed on the first substrate 115b and the projections formed on the second substrate 117b. That is, from the surface area of contact between the projections 119, it is possible to sense the force F applied to the first sensor and compute the intensity of the force F.

Meanwhile, the first sensor according to an embodiment of the present disclosure may be one of the sensors mentioned above with reference to FIGS. 14 to 16B, but there is no limitation thereto. That is, two or more of the aforementioned sensors may be combined and used as the first sensor.

Hereinafter, a display device according to another embodiment of the present disclosure and a vehicle control method using the same will be explained with reference to FIGS. 17 to 31D.

Configuration of Display Device According to Another Embodiment of the Present Disclosure An autonomous driving vehicle usually refers to a vehicle that navigates to a destination by recognizing the navigating environment by itself without any manipulation by a driver. Recently, autonomous driving technology is gathering much attention due to expectations that it may reduce a considerable amount of traffic accidents caused by humans' carelessness.

Development in the autonomous driving technology can bring flexibility to seat arrangements in vehicles. For example, there may be no such thing as a typical driver's seat, and the driver may not have to sit on a certain seat behind the wheels anymore.

Even if a vehicle guarantees a safe autonomous driving, however, the passenger may be required to control the vehicle when necessary or due to an unexpected event.

For example, if the passenger is facing backwards, he/she may not be able to recognize the navigating situation of the vehicle, or he/she may have difficulties in controlling the vehicle accordingly.

Therefore, with the development of autonomous driving vehicles, there is a need for studies on safe driving manipulation of vehicles together with improvement of user amenities.

Figure 17:
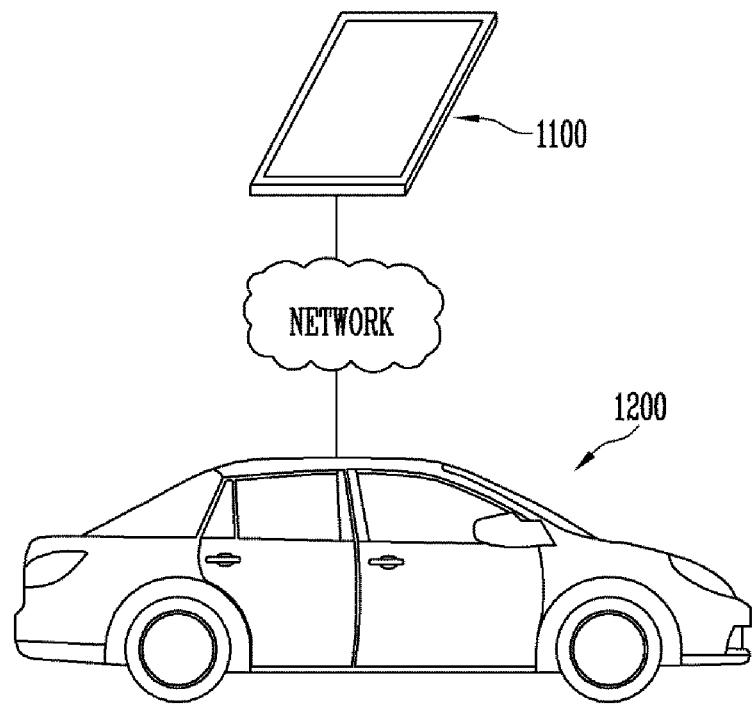
FIG. 17 is a view illustrating a vehicle control system that uses a display device according to an embodiment of the present disclosure.

FIG. 17 is a view illustrating a vehicle control system that uses a display device according to an embodiment of the present disclosure.

Referring to FIG. 17, the vehicle control system according to the embodiment of the present disclosure may include a display device 1100 and a vehicle 1200.

The display device 1100 may not only perform the general function of displaying contents on a screen but also a function of controlling driving of the vehicle 1200 when necessary.

For example, in the case where the vehicle 1200 is performing an autonomous driving normally, the user may view various contents such as videos and photos, etc. through the display device 1100.

Further, in the case where a manual manipulation of the vehicle 1200 by the user is necessary, it is possible to control the driving of the vehicle 1200 through the display device 1100.

For example, the user may control a navigating direction, speed, gear transmission and the like of the vehicle 1200 through the display device 1100.

The vehicle 1200 is a vehicle capable of autonomous driving, and also manual driving by a user's manipulation.

For example, the vehicle 1200 may perform the autonomous driving during autonomous driving modes, and perform the manual driving during manual driving modes.

Especially, during the manual driving modes, motions of the vehicle 1200 may be controlled according to a user's command being input into the display device 1100.

The display device 1100 and the vehicle 1200 may be connected via wireless network. Accordingly, passengers of the vehicle 1200 may easily use the display device 1100 regardless of their location in the vehicle 1200.

Various wireless networks may be used herein, for example, Bluetooth, Wireless-Fidelity (Wi-Fi), Radio Frequency Identification (RFID), Infrared Data Association (IrDA), ultra-wide band (UWB), ZigBee and Near Field Communication (NFC), etc., but without limitation.

The display device 1100 may be a portable terminal, for example, a smart phone, a laptop computer, a Personal Digital Assistant (PDA), a Portable Multimedia Player (PMP), a tablet and a wearable device, etc.

Further, the display device 1100 may be stationed at a certain place inside the vehicle 1200.

Meanwhile, the display device 1100 may or may not have flexibility.

Figure 18:
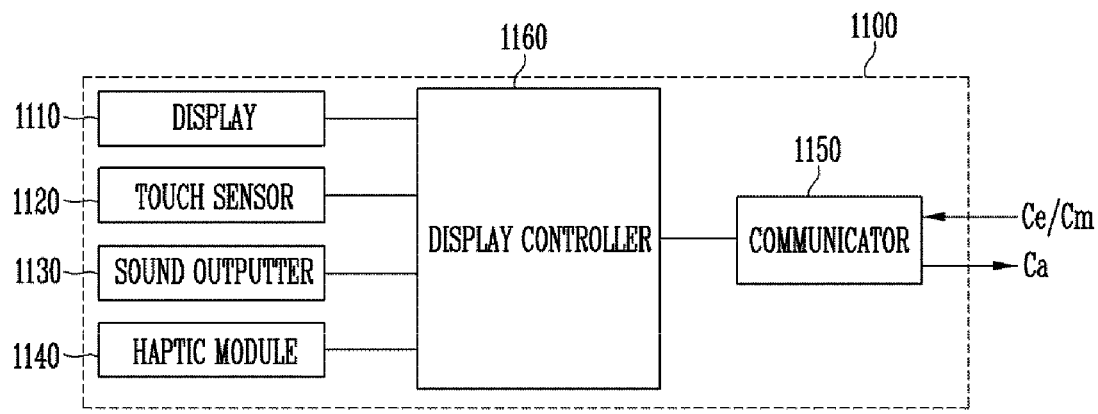
FIG. 18 is a view illustrating a display device according to an embodiment of the present disclosure.

FIG. 18 is a view illustrating a display device according to an embodiment of the present disclosure.

Referring to FIG. 18, the display device 1100 according to the embodiment of the present disclosure may include a display 1110, a touch sensor 1120, a sound outputter 1130, a haptic module 1140, a communicator 1150 and a display controller 1160.

The display 1110 may display certain images through an image display area. For this purpose, the display 1110 may include a plurality of pixels disposed in the image display area.

The display 1110 may be realized as display panels of various types, for example, an organic light emitting diode display panel, a liquid crystal display panel, a plasma display panel, an electrophoretic display panel and an electro wetting display panel, etc., but without limitation.

The touch sensor 1120 may detect a user's touch being input into the display device 1100.

For example, the touch sensor 1120 may form a mutual layered structure or an integrated structure with the display 1110, thereby realizing a touch screen.

Specifically, in order to recognize a touch being input into the image display area of the display 1110, the touch sensor 1120 may be disposed to overlap with at least a portion of the image display area.

The sound outputter 1130 may provide sounds necessary for operating the display device 1100 to the user. For example, the sound outputter 1130 may output sounds when playing videos or music, and generate signal sounds (for example, warning sounds) signaling that certain functions are being performed.

Such sound outputter 1130 may include a speaker for outputting sound.

The haptic module 1140 may generate various haptic effects that may be felt by the user, for example, vibration. The intensity, pattern and the like of the vibration generated in the haptic module 1140 may be controlled by the user's selection or by setting the display controller 1160. For example, the haptic module 1140 may synthesize different vibrations and output the same, or output different vibrations sequentially.

Further, the haptic module 1140 may provide the user with a haptic effect for signaling that a certain function is being performed.

The communicator 1150 may be connected to the vehicle 1200 by a wireless network and perform data transmitting/receiving with the vehicle 1200 via the wireless network.

The display controller 1160 may control the elements of the display device 1100 mentioned above.

For example, the display controller 1160 may control operations of the display 1110, the touch sensor 1120, the sound outputter 1130 and the haptic module 1140 according to the driving mode of the vehicle 1200.

Figure 19:
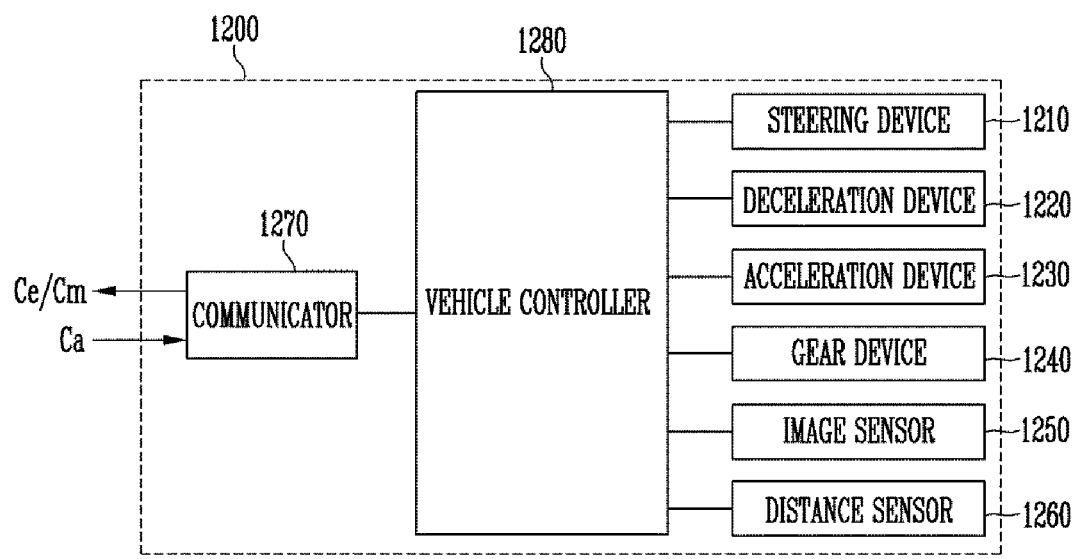
FIG. 19 is a view illustrating a vehicle according to an embodiment of the present disclosure.

FIG. 19 is a view illustrating a vehicle according to an embodiment of the present disclosure.

Referring to FIG. 19, the vehicle 1200 according to the embodiment of the present disclosure may include a steering device 1210, a deceleration device 1220, an acceleration device 1230, a gear device 1240, an image sensor 1250, a distance sensor 1260, a communicator 1270 and a vehicle controller 1280.

The vehicle controller 1280 may perform autonomous driving of the vehicle 1200 by automatically controlling the driving devices 1210, 1220, 1230, 1240 during the autonomous driving mode.

For example, the vehicle controller 1280 may automatically control the driving devices 1210, 1220, 1230, 1240 using information sensed through the image sensor 1250 and the distance sensor 1260.

The image sensor 1250 may be mounted onto the vehicle 1200 and obtain images (for example, front image, rear image and side image, etc.) surrounding the vehicle 1200.

A plurality of image sensors 1250 may be installed, and may include a camera for photographing the images surrounding the vehicle 1200.

The distance sensor 1260 may detect an object (for example, vehicles and obstacles, etc.) surrounding the vehicle 1200, and may measure a distance between the vehicle 1200 and the object. That is, the distance sensor 1260 may detect information on objects surrounding the vehicle 1200. For example, the distance sensor 1260 may be realized as a Radio Detection And Ranging (RADAR), Light Detection And Ranging (LIDAR), ultrasonic wave sensor, infrared ray sensor and laser sensor, etc., but without limitation.

However, there are cases where manual driving by a passenger is necessary due to situations during the autonomous driving mode.

For example, when something goes wrong in the image sensor 1250, distance sensor 1260 or the like necessary for autonomous driving, a stable autonomous driving is not possible any longer, and thus the vehicle 1200 may enter the manual driving mode.

In such a case, the vehicle controller 1280 may transmit a mode change signal Ce to the display device 1100 through the communicator 1150.

Here, the display device 1100 may receive the mode change signal Ce through the communicator 1150, in which case the display controller 1160 may recognize that the vehicle 1200 entered the manual driving mode.

In response, the display controller 1160 may provide a graphical user interface GUI for controlling vehicle to the display 1110.

The user may control driving of the vehicle 1200 through touch inputs to the GUI for controlling vehicle.

That is, the display controller 1160 may recognize a user's touch input through the touch sensor 1120, and generate a vehicle control signal Ca reflecting the user's touch input. Here, the generated vehicle control signal Ca may be transmitted to the vehicle 1200 through the communicator 1150.

Therefore, the vehicle controller 1280 may receive a vehicle control signal Ca through the communicator 1270, and the vehicle controller 1280 may control at least one of the steering device 1210, the deceleration device 1220, the acceleration device 1230 and the gear device 1240 in response to the vehicle control signal Ca.

For example, the vehicle control signal Ca may include a steering control signal for controlling steering of the vehicle 1200, a deceleration and acceleration control signal for controlling the velocity of the vehicle 1200, and a gear control signal for controlling the gear transmission of the vehicle 1200.

Meanwhile, the vehicle controller 1280 may transmit the surrounding image information Cm of the vehicle 1200 obtained through the image sensor 1250 to the display device 1100.

Accordingly, the display controller 1160 of the display device 1100 may display images surrounding the vehicle 1200 on the image display area of the display 1110 using the surrounding image information Cm transmitted from the vehicle 1200.

Meanwhile, when the display controller 1160 receives a mode change signal Ce from the vehicle 1200, the display controller 1160 may notify the user that the vehicle entered the manual driving mode.

For example, the display controller 1160 may control the sound outputter 1130 to generate a warning sound notifying that the vehicle entered the manual driving mode. Further, the display controller 1160 may control the haptic module 1140 to generate the haptic effect (for example, vibration) notifying that the vehicle entered the manual driving mode.

The warning sound and the haptic effect may be generated simultaneously or sequentially, and one of the warning sound and the haptic effect may be omitted.

The communicator 1270 of the vehicle 1200 may perform wireless communication through the communicator 1150 of the display device 1100 and a predetermined wireless network.

Figure 20:
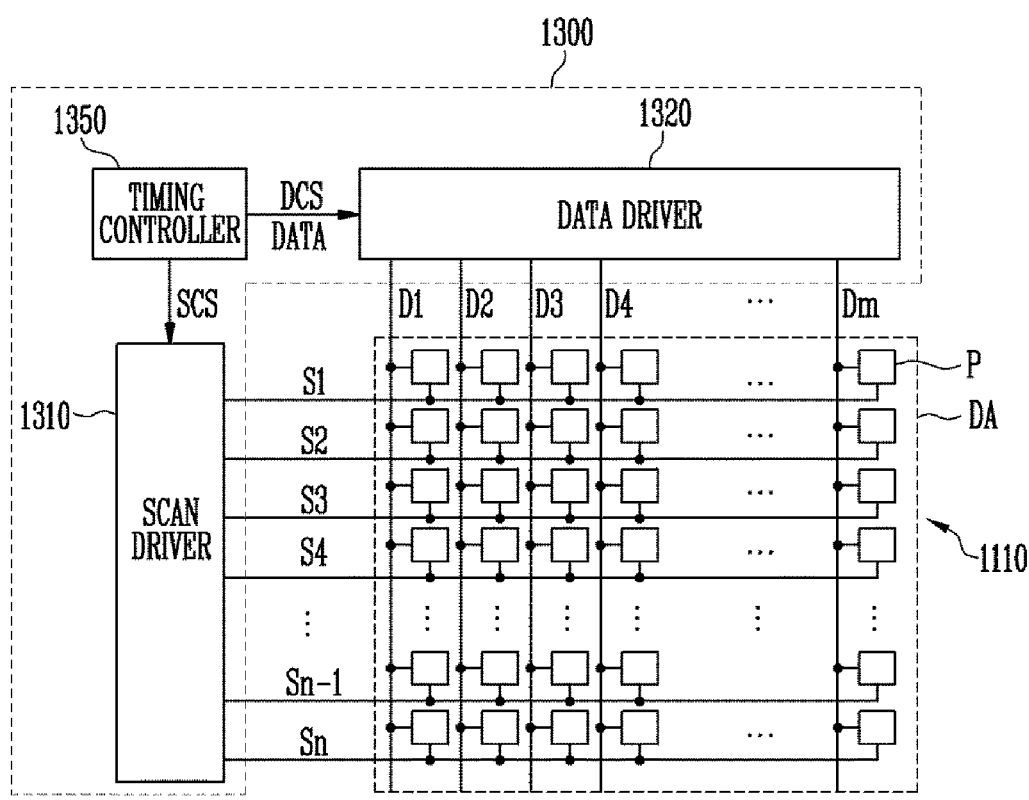
FIG. 20 is a display and a display driver according to an embodiment of the present disclosure.

FIG. 20 is a view illustrating a display and a display driver according to an embodiment of the present disclosure.

Referring to FIG. 20, the display 1110 of the embodiment of the present disclosure may include a plurality of data lines D1~Dm, a plurality of scan lines S1~Sn and a plurality of pixels P.

The pixels P may be disposed in the image display area DA of the display 1110, and may be connected to the data lines D1~Dm and the scan lines S1~Sn.

Further, each pixel P may be provided with a data signal and a scan signal through the data lines D1~Dm and the scan lines S1~Sn.

The display driver 1300 may include a scan driver 1310, a data driver 1320 and a timing controller 1350.

The scan driver 1310 may supply scan signals to the scan lines S1~Sn in response to a scan driver control signal SCS. For example, the scan driver 1310 may supply the scan signals sequentially to the scan lines S1~Sn.

The scan driver 1310 may be electrically connected to the scan lines S1~Sn disposed in the display 1110 through a separate element (for example, circuit board).

In another embodiment, the scan driver 1310 may be directly mounted onto the display 1110.

The data driver 1320 may receive an input of a data driver control signal DCS and image data DATA from the timing controller 1350, and generate a data signal.

The data driver 1320 may supply the generated data signal to the data lines D1~Dm.

The data driver 1320 may be electrically connected to the data lines D1~Dm disposed in the display 1110 through a separate element (for example, circuit board).

In another embodiment, the data driver 1320 may be directly mounted onto the display 1110.

When a scan signal is supplied to a certain scan line, some of the pixels P connected to the certain scan line may be supplied with the data signal transmitted from the data lines D1~Dm, and the some of the pixels P may emit light of a certain brightness corresponding to the supplied data signal.

The timing controller 1350 may generate control signals for controlling the scan driver 1310 and the data driver 1320.

For example, the control signals may include a scan driver control signal SCS for controlling the scan driver 1310 and a data driver control signal DCS for controlling the data driver 1320.

Further, the timing controller 1350 may supply the scan driver control signal SCS to the scan driver 1310 and supply the data driver control signal DCS to the data driver 1320.

The timing controller 1350 may convert the image data to fit the specifications of the data driver 1320, and supply the converted image data DATA to the data driver 1320.

The aforementioned display driver 1300 may perform the roles for controlling the display 1110, which may be included in the aforementioned display controller 1160.

Figure 21A:
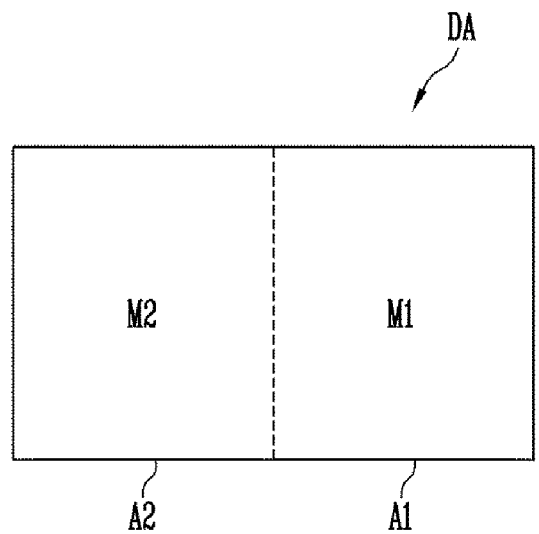
FIGS. 21A and 21B are views illustrating an image display area in a manual driving mode according to an embodiment of the present disclosure.
Figure 21B:
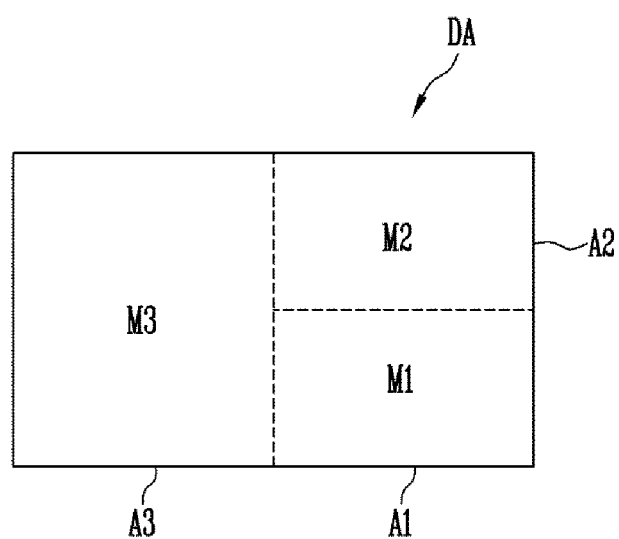

FIGS. 21A and 21B are views illustrating an image display area in a manual driving mode according to an embodiment of the present disclosure.

Referring to FIG. 21A, in the case where the vehicle 1200 entered the manual driving mode, the display 1110 may display a GUI for controlling vehicle M1 on at least a portion of the image display area DA.

For example, the GUI for controlling vehicle M1 may be displayed on the first area A1 included in the image display area DA.

Further, the display 1110 may display a surrounding image M2 of the vehicle 1200 on another portion (for example, a second area A2) of the image display area DA.

Here, the surrounding image M2 of the vehicle 1200 may be obtained through the image sensor 1250 installed in the vehicle 1200.

Therefore, the passenger may manually control the driving of the vehicle 1200 through the GUI for controlling vehicle M1 while viewing the surrounding image M2 of the vehicle 1200.

FIG. 21A illustrates a case where the image display area DA is divided into two areas A1, A2, but the division method of the image display area DA may vary, and further, the arrangement structure of the first area A1 and the second area A2 may vary as well.

Referring to FIG. 21B, unlike FIG. 21A, the image display area DA may further include a third area A3.

Here, on the third area A3, contents M3 such as videos, photos and the like may be displayed.

For example, in the autonomous driving mode, the user may view the contents M3 displayed on the image display area DA.

In the case of entering the manual driving mode due to an emergency situation, the image display area DA may be converted as illustrated in FIG. 21A, or in FIG. 21B.

In the case where the image display area DA is converted as illustrated in FIG. 21B, in the autonomous driving mode, the contents M3 that the passenger was viewing may be displayed continuously.

In FIG. 21B, it is illustrated that the image display area DA is divided into three areas A1, A2, A3, but the division method of the image display area DA may vary, and further, the arrangement structure of the first area A1, the second area A2 and the third area A3 may vary as well.

Although there is no separate illustration of the image display area DA during the autonomous driving mode, a third area A3 for displaying contents M3 may basically be included. Further, in the image display area DA during the autonomous driving mode, a first area A1 for displaying the GUI for controlling vehicle M1 and/or a second area A2 for displaying the surrounding image M2 of the vehicle 1200 may be included besides the third area A3.

Figure 22:
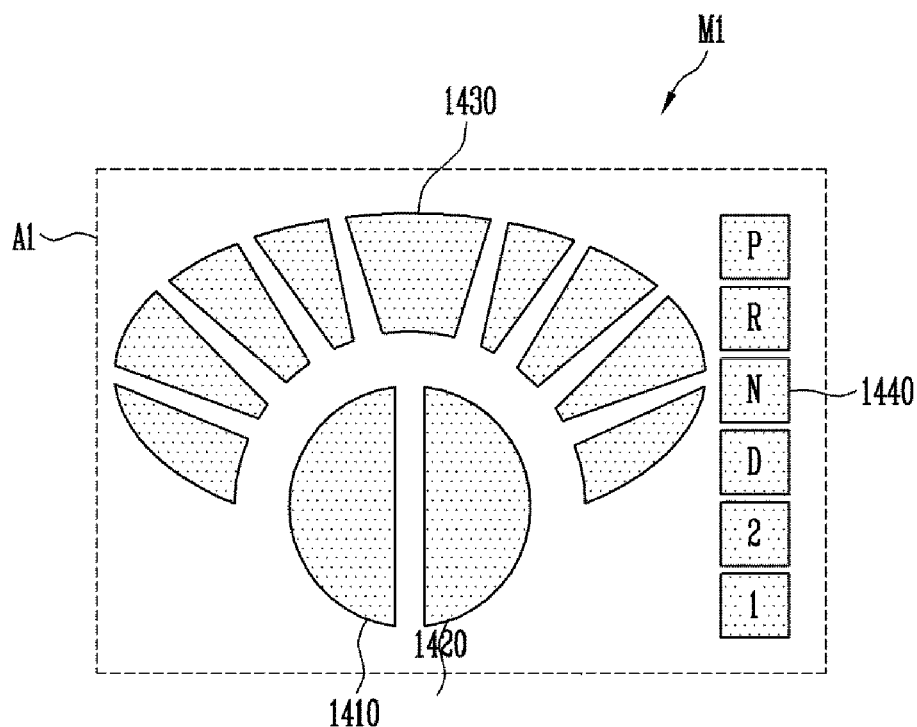
FIG. 22 is a view illustrating a graphic user interface for controlling vehicle according to an embodiment of the present disclosure.

FIG. 22 is a view illustrating a graphic user interface for controlling vehicle according to an embodiment of the present disclosure.

Referring to FIG. 22, of the image display area DA of the display 1110, the GUI for controlling vehicle M1 may be displayed on the first area A1.

Such GUI for controlling vehicle M1 may include numerous objects 1410, 1420, 1430, 1440 for controlling driving of the vehicle 1200.

For example, the GUI for controlling vehicle M1 may include a deceleration control object 1410 and an acceleration control object 1420 for controlling velocity of the vehicle 1200, a plurality of steering control objects 1430 for adjusting a steering direction of the vehicle 1200, and a plurality of gear control objects 1440 for adjusting a gear of the vehicle 1200.

Here, the deceleration control object 1410 may correspond to a brake of the vehicle, and the acceleration control object 1420 may correspond to the accelerator of the vehicle.

Further, the steering control objects 1430 may correspond to a steering wheel of the vehicle, and the gear control objects 1440 may correspond to a gear control lever of the vehicle.

The acceleration control object 1420 may be disposed at a right side of the deceleration control object 1410, and the gear control objects 1440 may be disposed at a right side of the deceleration control object 1410, the acceleration control object 1420 and the steering control objects 1430.

Further, the steering control objects 1430 may be arranged in a shape of surrounding the deceleration control object 1410 and the acceleration control object 1420.

Each of the gear control objects 1440 may also display a gear stage of a gear.

For example, each of the gear control objects 1440 may also display the gear stages such as P, R, N, D, 2 and 1, respectively.

During the manual driving mode of the vehicle 1200, the user may adjust the velocity of the vehicle 1200 by touching the deceleration control object 1410 and the acceleration control object 1420, and may adjust the driving direction of the vehicle 1200 by touching the steering control objects 1430, and adjust the gear stage of the vehicle 1200 by touching the gear control objects 1440.

Figure 23:
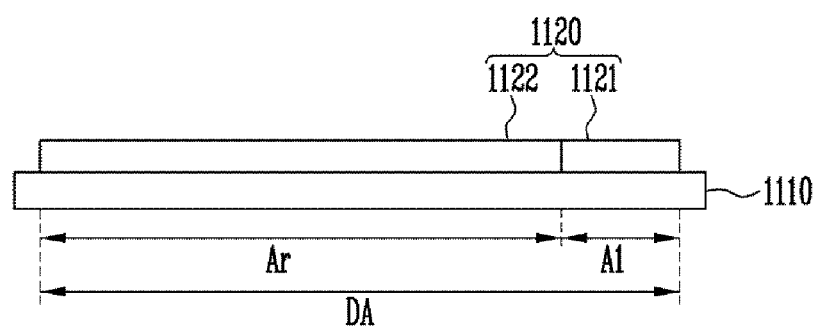
FIG. 23 is a view illustrating a display and a touch sensor according to an embodiment of the present disclosure.

FIG. 23 is a view illustrating a display and a touch sensor according to an embodiment of the present disclosure.

Referring to FIG. 23, the touch sensor 1120 according to the embodiment of the present disclosure may be disposed to overlap with the display 1110.

This is to sense the user's touch being input into the image display area DA of the display 1110, and the touch sensor 1120 may overlap with at least a portion of the image display area DA.

The coupling method of the display 1110 and the touch sensor 1120 may vary. For example, they may be coupled in an in-cell method or an on-cell method, but without limitation.

The touch sensor 1120 may include a first touch sensor 1121 for sensing a touch being input into the first area A1. For this purpose, the first touch sensor 1121 may be disposed to overlap with the first area A1.

For example, the user may recognize the GUI for controlling vehicle M1 being disposed on the first area A1, and perform a touch on the GUI for controlling vehicle M1.

Here, the first touch sensor 1121 may sense a location, a force and the like of the touch. The detailed first touch sensor 1121 will be explained later.

Further, the touch sensor 1120 may include a second touch sensor 1122 for sensing a touch being input into the rest of the area Ar besides the first area A1 of the image display area DA. For this purpose, the second touch sensor 1122 may be disposed to overlap with the rest of the area Ar.

For example, the user may perform a touch regarding the surrounding image M2 of the vehicle 1200 and the contents M3 being displayed on the rest of the area Ar.

Here, the second touch sensor 1122 may be realized in various methods. For example, the second touch sensor 1122 may be realized as a capacitive touch sensor, a resistive touch sensor, an optical touch sensor, or the like, but without limitation.

Figure 24:
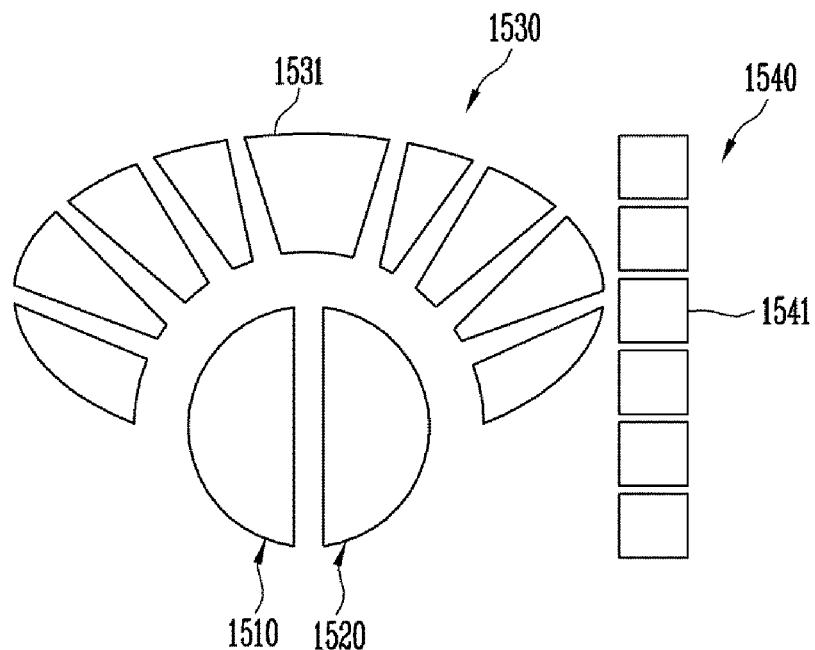
FIG. 24 is a view illustrating a first touch sensor according to an embodiment of the present disclosure.

FIG. 24 is a view illustrating a first touch sensor according to an embodiment of the present disclosure.

Referring to FIG. 24, the first touch sensor 1121 according to the embodiment of the present disclosure may include a deceleration touch sensor 1510, an acceleration touch sensor 1520, a steering touch sensor 1530, and a gear touch sensor 1540.

The deceleration touch sensor 1510 may sense a touch being input into the deceleration control object 1410 of the GUI for controlling vehicle M1.

Further, the deceleration touch sensor 1510 may be realized as a force sensor capable of sensing a force of a touch such that it operates similarly as an actual brake.

In order to improve the exactness of a touch input, the deceleration control object 1410 may have a shape that is the same as or different from that of the deceleration touch sensor 1510, and the deceleration control object 1410 may be displayed on a location that overlaps with the deceleration touch sensor 1510 in the first area A1.

In the case where the user touches the deceleration control object 1410 in the manual driving mode, the display controller 1160 may detect a force of the input touch, and may transmit a vehicle control signal Ca where the detected force is reflected, to the vehicle controller 1280.

Here, the vehicle controller 1280 may adjust the deceleration device 1220 with reference to the force information included in the vehicle control signal Ca, and accordingly, the velocity of the vehicle 1200 may be reduced.

The acceleration touch sensor 1520 may sense a touch being input into the acceleration control object 1420 of the GUI for controlling vehicle M1.

Further, the acceleration touch sensor 1520 may be realized as a force sensor capable of sensing a force of a touch such that it operates similarly as an actual accelerator.

In order to improve the exactness of a touch input, the acceleration control object 1420 may have a shape that is the same as or similar to the acceleration touch sensor 1520, and may be displayed on a location that overlaps with the acceleration touch sensor 1520 of the first area A1.

The acceleration touch sensor 1520 may be disposed at a right side of the deceleration touch sensor 1510, that is the same as the arrangement structure of the actual brake and the accelerator.

When the user touches the acceleration control object 1420 in the manual driving mode, the display controller 1150 may detect a force of the touch input, and further, the display controller 1150 may transmit the vehicle control signal Ca where the detected force is reflected, to the vehicle controller 1280.

Here, the vehicle controller 1280 may adjust the acceleration device 1230 with reference to the force information included in the vehicle control signal Ca, and accordingly, the velocity of the vehicle 1200 may be increased.

The steering touch sensor 1530 may sense the touch being input into the steering control objects 1430 of the GUI for controlling vehicle M1.

Here, the steering touch sensor 1530 may be realized as a self-capacitive touch sensor.

For this purpose, the steering touch sensor 1530 may include a plurality of electrodes 1531, and the display controller 1160 may detect the location of the touch based on the amount of change of the self-capacitance of the electrodes 1531.

In order to increase the exactness of the touch input, the steering control objects 1430 may have a shape that is the same as or similar to the electrodes 1531 of the steering touch sensor 1530, and may be displayed on a location overlapping with each electrode 1531 in the first area A1.

The electrodes 1531 of the steering touch sensor 1530 may be arranged such that they surround the deceleration touch sensor 1510 and the acceleration touch sensor 1520.

Here, the shape and surface area of the electrodes 1531 may be set to be the same or to be different depending on their locations. For example, the electrodes 1531 may be arranged in a bilaterally symmetrical form.

When the user touches at least one of the steering control objects 1430 in the manual driving mode, the display controller 1160 may detect the location of the input touch, and may transmit the vehicle control signal Ca where the detected touch location is reflected, to the vehicle controller 1280.

Here, the vehicle controller 1280 may adjust the steering device 1210 with reference to the touch location information included in the vehicle control signal Ca, and accordingly, the driving direction of the vehicle 1200 may be changed.

Further, in the case where a plurality of touch inputs are generated by slide touches or the like regarding the steering control objects 1430, the display controller 1160 may detect the direction of the touch input, and may transmit the vehicle control signal Ca where the detected direction of the touch input is reflected, to the vehicle controller 1280.

Therefore, the vehicle controller 1280 may adjust the steering device 1210 with reference to the information on the direction of the touch included in the vehicle control signal Ca, and accordingly, the driving direction of the vehicle 1200 may be changed.

The electrodes 1531 of the steering touch sensor 1530 may include a conductive material. In an embodiment of the present disclosure, the conductive material may include metal or an alloy thereof. Examples of the metal include gold (Au), silver (Ag), aluminum (Al), molybdenum (Mo), chrome (Cr), titanium (Ti), nickel (Ni), neodymium (Nd), copper (Cu) and platinum (Pt), etc.

Otherwise, the electrodes 1531 may be made of a transparent conductive material. Examples of the transparent conductive material include silver nano wire (AgNW), indium tin oxide (ITO), indium zinc oxide (IZO), antimony zinc oxide (AZO), indium tin zinc oxide (ITZO), zinc oxide (ZnO), tin oxide ($SnO_2$), carbon nano tube and graphene, etc. The electrodes 1531 may have a single-layered structure or a multiple-layered structure, for example, a multiple layer where two or more of the aforementioned materials are laminated.

The gear touch sensor 1540 may sense a touch being input into the gear control objects 1440 of the GUI for controlling vehicle M1.

Here, the gear touch sensor 1540 may be realized as a self-capacitive sensor.

For this purpose, the gear touch sensor 1540 may include a plurality of electrodes 1541, and the display controller 1160 may detect a touch location based on an amount of change of the self-capacitance of the electrodes 1541.

The shape and surface area of the electrodes 1541 may be set to be the same or to be different depending on their locations. The shape of the electrodes 1541 may vary, for example, a rectangle, a triangle, a circle and the like.

In order to increase the exactness of a touch input, the gear control objects 1440 may have shapes that are the same as or similar to the electrodes 1541 of the gear touch sensor 1540, and may be displayed on a location overlapping with each of the electrodes 1541 in the first area A1.

The gear touch sensor 1540 may be disposed at a right-most side compared to the deceleration touch sensor 1510, the acceleration touch sensor 1520 and the steering touch sensor 1530, that is the same as the arrangement structure of the actual gear control lever.

When the user touches any one of the gear control objects 1440 in the manual driving mode, the display controller 1160 may detect a location of the input touch, and accordingly, may recognize the gear stage selected by the user.

Therefore, the display controller 1160 may transmit information where the gear stage selected by the user is reflected, to the vehicle controller 1280.

Here, the vehicle controller 1280 may adjust the gear device 1240 with reference to the information on the gear stage included in the vehicle control signal Ca, and accordingly, the gear stage of the vehicle 1200 may be changed.

The electrodes 1541 of the gear touch sensor 1540 may be made of a same material as the electrodes 1531 of the steering touch sensor 1530, and may have a same layered structure as the electrodes 1531 of the steering touch sensor 1530.

Figure 25:
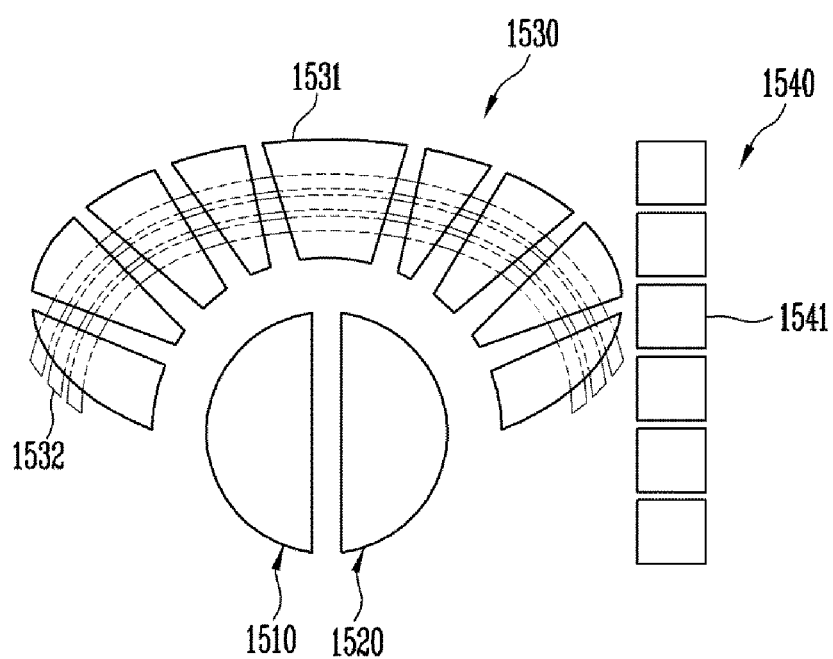
FIG. 25 is a view illustrating a first touch sensor according to another embodiment of the present disclosure.

FIG. 25 is a view illustrating a first touch sensor according to another embodiment of the present disclosure.

Referring to FIG. 25, the steering touch sensor 1530 according to the embodiment of the present disclosure may be realized as a mutual-capacitive touch sensor.

For this purpose, the steering touch sensor 1530 may include first electrodes 1531 and second electrodes 1532.

The first electrodes 1531 and the second electrodes 1532 may be arranged such that they surround the deceleration touch sensor 1510 and the acceleration touch sensor 1520.

Here, the first electrodes 1531 and the second electrodes 1532 may be arranged to mutually intersect each other.

For example, in the case where the first electrodes 1531 are disposed as illustrated in FIG. 25, the second electrodes 1532 may be bent and extent in a direction to intersect the first electrodes 1531.

Accordingly, mutual-capacitance is formed between the first electrodes 1531 and the second electrodes 1532, and the display controller 1160 may detect a touch location based on an amount of change of the capacitance.

In order to prevent electrical connection between the first electrodes 1531 and the second electrodes 1532, an insulating film (not illustrated) may be disposed near an area where the first electrodes 1531 and the second electrodes 1532 intersect each other.

Figure 26A:
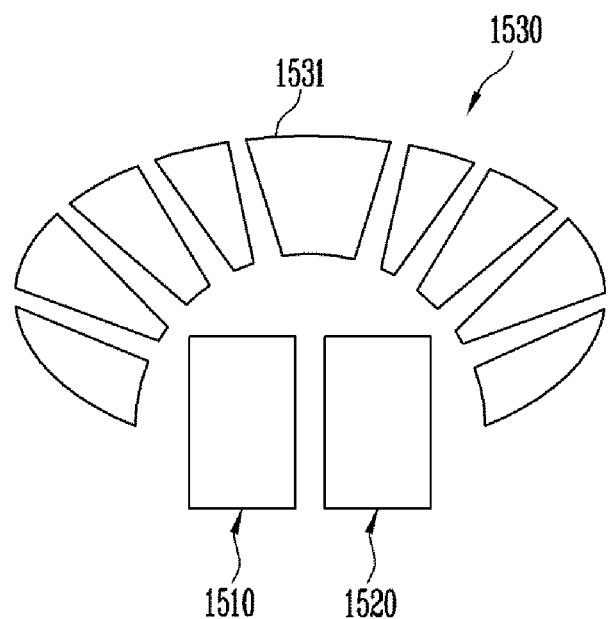
FIGS. 26A, 26B and 26C are views illustrating examples of various forms of a deceleration touch sensor, an acceleration touch sensor and a steering touch sensor according to an embodiment of the present disclosure.
Figure 26B:
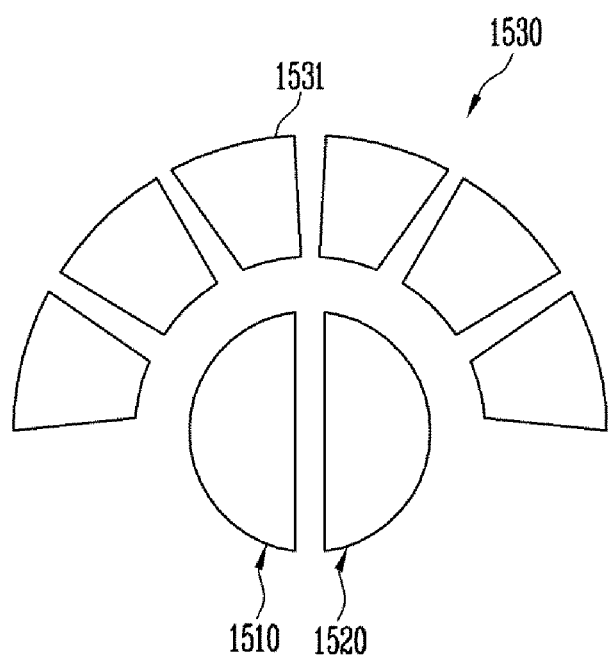
Figure 26C:
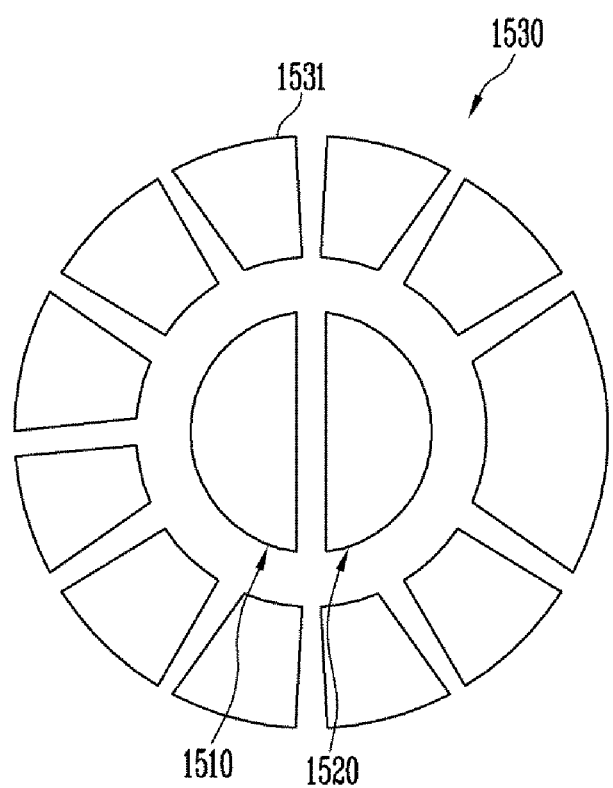

FIGS. 26A, 26B and 26C are views illustrating various examples of shapes of the deceleration touch sensor, the acceleration touch sensor and the steering touch sensor according to an embodiment of the present disclosure.

Referring to FIG. 26A, the deceleration touch sensor 1510 and the acceleration touch sensor 1520 may have rectangular shapes.

The actual shape of the deceleration touch sensor 1510 and the acceleration touch sensor 1520 may vary. For example, the deceleration touch sensor 1510 and the acceleration touch sensor 1520 may have a semicircular shape (refer to FIG. 24), a circular shape, a triangular shape, or the like.

Referring to FIG. 26B, the electrodes 1531 of the steering touch sensor 1530 may have shapes where the closer it is to the outer side, the greater the width.

For example, the electrodes 1531 may have fan shapes or shapes similar to fans, but without limitation. The shape of the electrodes 1531 may vary.

Referring to FIG. 26C, the electrodes 1531 of the steering touch sensor 1531 may be arranged such that they generally surround the deceleration touch sensor 1510 and the acceleration touch sensor 1520.

FIGS. 26A, 26B and 26C are views illustrating examples of the various shapes and arrangement structures of the sensors 1510, 1520, 1530, 1540 of the present disclosure, but without limitation.

Hereinafter, the deceleration touch sensor 1510 and the acceleration touch sensor 1520 according to an embodiment of the present disclosure will be explained in detail with reference to FIGS. 27 to 29B.

Here, the deceleration touch sensor 1510 and the acceleration touch sensor 1520 may have a same structure, and thus, explanation herein will focus on the deceleration touch sensor 1510.

Figure 27:
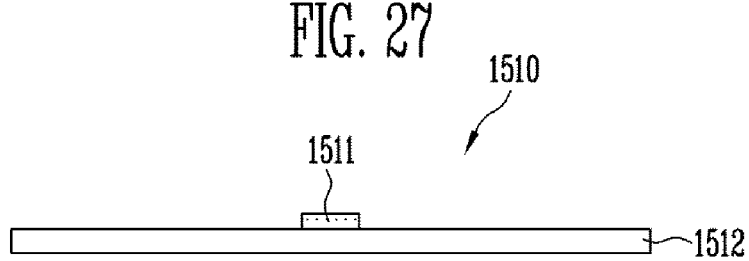
FIG. 27 is a view illustrating a deceleration touch sensor according to an embodiment of the present disclosure.

FIG. 27 is a view illustrating the deceleration touch sensor according to an embodiment of the present disclosure.

The deceleration touch sensor 1510 may perform a function of a force sensor of sensing a force of a touch as aforementioned.

Referring to FIG. 27, the deceleration touch sensor 1510 according to an embodiment of the present disclosure may include a variable resistance element 1511.

The variable resistance element 1511 may be disposed on a separate base layer 1512. The variable resistance element 1511 is an element of which the electrical characteristics change according to the extent it is deformed. Its resistance may change in response to the force (or strength) being applied from outside. For example, the greater the force being provided to the variable resistance element, the smaller the resistance of the variable resistance element may become. Or to the contrary, the greater the force being provided to the variable resistance element, the greater the resistance of the variable resistance element may become.

Therefore, the display controller 1160 may detect a touch force based on an amount of change of the resistance of the variable resistance element 1511.

The variable resistance element 1511 may include a material of which the resistance changes according to force applied to the variable resistance element 1511. For example, the variable resistance element may contain materials called a force sensitive material or a force sensitive resistor, etc.

The variable resistance element 1511 may contain at least one of a piezo-electric material such as lead zirconate titanate (PZT) and polyvinylidene fluoride (PVDF) or the like, carbon powder, quantum tunneling composite (QTC), silicone, carbon nano tube and graphene, etc.

Further, the variable resistance element 1511 may contain nano particles. The nano particles may be provided as nano tubes, nano columns, nano loads, nano pores or nano wires, etc.

The nano particles may be particles containing carbon, graphite, metalloid, metal, a conductive oxide of metalloid or metal, or a conductive nitride of metalloid or metal; or particles of core shell structures of insulating beads coated with the particles; or a combination thereof. The metalloid may contain any one of antimony(Sb), germanium(Ge), arsenic(As), and an alloy thereof. The metal may contain zinc(Zn), aluminum(Al), scandium(Sc), chrome(Cr), manganese(Mn), iron(Fe), cobalt(Co), nickel(Ni), copper(Cu), indium(In), tin(Sn), yttrium(Y), zirconium(Zr), niobium (Nb), molybdenum(Mo), ruthenium(Ru), rhodium(Rh), palladium(Pd), gold(Au), silver(Ag), platinum(Pt), strontium (Sr), tungsten(W), cadmium(Cd), tantalum(Ta), titanium(Ti) or an alloy thereof. The conductive oxide may contain indium-tin-oxide (ITO), indium-zinc-oxide(IZO), zinc oxide doped with aluminum (AZO), gallium-indium-zinc-oxide (GIZO), zinc oxide, or a mixed compound thereof.

In an embodiment of the present disclosure, the nano particle may be at least one of carbon nano tube, graphene and silver nano wire, but there is no limitation thereto.

Further, the shape of the variable resistance element 1511 is not limited to that illustrated in FIG. 27, and may thus vary.

Figure 28A:
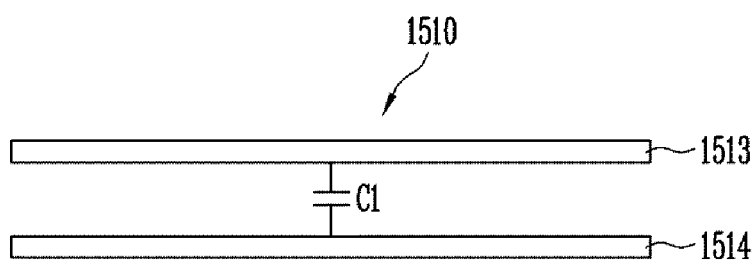
FIGS. 28A and 28B are views provided to explain a deceleration touch sensor and an operation method thereof according to another embodiment of the present disclosure.
Figure 28B:
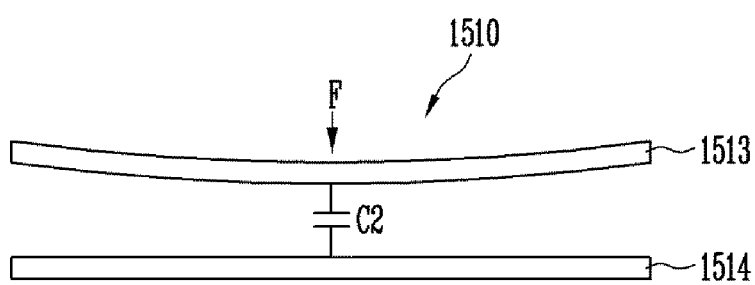

FIGS. 28A and 28B are views provided to explain a deceleration touch sensor and a method for operating the same according to another embodiment of the present disclosure.

Referring to FIG. 28A and FIG. 28B, the deceleration touch sensor 1510 may include a first conductor 1513 and a second conductor 1514.

The first conductor 1513 and the second conductor 1514 may be disposed to be spaced apart from each other.

Further, there may be an additional element disposed between the first conductor 1513 and the second conductor 1514.

The first conductor 1513 and the second conductor 1514 contain a conductive material. In an embodiment of the present disclosure, the conductive material may be metal or an alloy of metal. Examples of the metal include gold (Au), silver (Ag), aluminum (Al), molybdenum (Mo), chrome (Cr), titanium (Ti), nickel (Ni), neodymium (Nd), copper (Cu) and platinum (Pt), etc.

In an embodiment of the present disclosure, the first conductor 1513 and the second conductor 1514 may be made of a transparent conductive material. Examples of the transparent conductive material include silver nano wire (AgNW), indium tin oxide (ITO), indium zinc oxide (IZO), antimony zinc oxide (AZO), indium tin zinc oxide (ITZO), zinc oxide (ZnO), tin oxide (SnO$_2$), carbon nano tube and graphene, etc. The first conductor 1513 and the second conductor 1514 may be made of a single layer or multiple layers. For example, the first conductor 1513 and the second conductor 1514 may include multiple layers where two or more of the aforementioned materials are laminated.

Although the first conductor 1513 and the second conductor 1514 are illustrated in the drawings to have plate shapes, there is no limitation thereto, and thus their shapes may vary.

Further, the second conductor 1514 may be made of a same material as or a different material from the first conductor 1513.

Meanwhile, FIG. 28A illustrates a state where a force F is not applied to the deceleration touch sensor 1510, and FIG. 28B illustrates a state where a force F is applied to the deceleration touch sensor 1510.

Referring to FIG. 28A, in the case where a force F is not applied to the first sensor, a first capacitance C1 is formed between the first conductor 1513 and the second conductor 1514.

Referring to FIG. 15B, in the case where the force F is applied to the first sensor by a user's touch or the like, the distance between the first conductor 1513 and the second conductor 1514 changes, and accordingly, the capacitance formed by the first conductor 1513 and the second conductor 1514 may change. For example, the first capacitance C1 may change to a second capacitance C2 by the force F being applied.

Consequently, the mutual capacitance of the first conductor 1513 and the second conductor 1514 may vary in response to the force F being applied from outside.

Therefore, the display controller 1160 may detect a touch force F based on an amount of change of the mutual-capacitance.

Figure 29A:
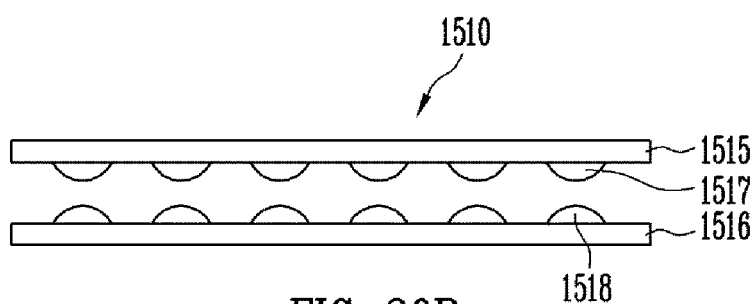
FIGS. 29A and 29B are views provided to explain a deceleration touch sensor and an operation method thereof according to another embodiment of the present disclosure.
Figure 29B:
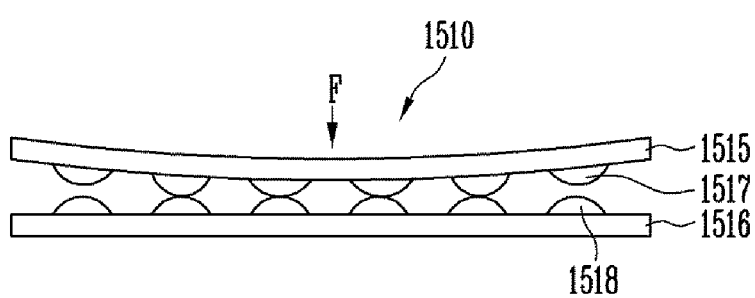

FIGS. 29A and 29B are views provided to explain a deceleration touch sensor and a method for operating the same according to another embodiment of the present disclosure.

Referring to FIG. 29A and FIG. 29B, the deceleration touch sensor 1510 may include a first substrate 1515 and a second substrate 1516.

The first substrate 1515 and the second substrate 1516 may be disposed to be spaced apart from each other.

Further, in each of the first substrate 1515 and the second substrate 1516, a plurality of projections 1517, 1518 may be formed.

The first substrate 1515 and the second substrate 1516 may be arranged such that first projections 1517 formed on the first substrate 1515 and second projections 1518 formed on the second substrate 1516 face each other. Further, each of the first projections 1517 may be provided in a location corresponding to each of the second projections 1518.

The projections 1517, 1518 may contain a conductive material. In an embodiment of the present disclosure, the conductive material forming the projections 1517, 1518 may contain metal or an alloy of metal. Examples of the metal or the alloy of metal that may be used herein are the same as aforementioned, and thus further explanation will be omitted.

Meanwhile, although the projections 1517, 1518 are illustrated in shapes as if an elliptical portion is removed, there is no limitation thereto, and thus the shape of the projection 1517, 1518 may vary.

Meanwhile, FIG. 29A illustrates a state where a force F is not applied to the deceleration touch sensor 1510, and FIG. 29B illustrates a state where a force F is applied to the deceleration touch sensor 1510.

Referring to FIG. 29A, in the case where a force F is not applied to the deceleration touch sensor 1510, the first projections 1517 and the second projections 1518 are spaced apart from each other.

Referring to FIG. 29B, in the case where a force F is applied to the deceleration touch sensor 1510 by a user's touch or the like, the distance between the first substrate 1515 and the second substrate 1516 changes, and accordingly, a portion of the first projections 1517 and the second projections 1518 contact each other.

Here, the greater the intensity of the force F, the greater the surface area of contact between the first projections 1517 and the second projections 1518 may become.

Therefore, based on an amount of change of the surface area of contact between the first projections 1517 and the second projections 1518, it is possible to detect a touch force F.

Figure 30:
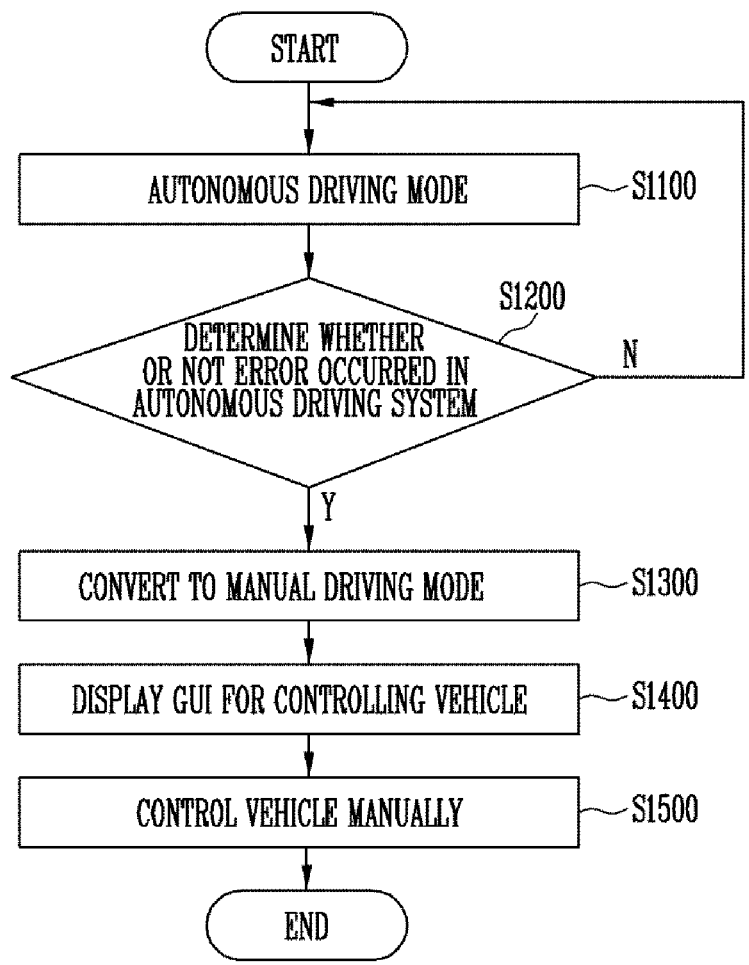
FIG. 30 is a flowchart illustrating a vehicle control method using a display device according to an embodiment of the present disclosure.

FIG. 30 is a flowchart illustrating a vehicle control method using a display device according to an embodiment of the present disclosure.

Referring to FIG. 30, a vehicle 1200 set to an autonomous driving mode may perform an autonomous driving (refer to S1100).

Here, a passenger may freely use games and contents using the display device 1100 connected to the vehicle 1200 via wireless network.

Thereafter, a step of determining whether or not an error occurred in the autonomous driving system of the vehicle 1200 may be performed (S1200).

For example, when an error occurred in the image sensor, distance sensor, or the like that are necessary in the autonomous driving, the vehicle 1200 may end the autonomous driving and convert to a manual driving (refer to S1300).

When entering the manual driving, the display device 1100 may generate a warning sound and/or a haptic effect in order to notify the user.

If there is nothing wrong with the autonomous driving system, the autonomous driving mode may continue.

When entering the manual driving mode, the display device 1100 may display a GUI for controlling vehicle M1 on at least a portion of the image display area DA (for example, on the first area A1) (refer to S1400).

The GUI for controlling vehicle M1 was already explained hereinabove with reference to FIG. 22, and thus further explanation will be omitted.

Thereafter, a step of manually controlling the vehicle 1200 in response to a user's touch being input into the GUI for controlling vehicle M1 may be performed (S1500).

That is, in the case of an emergency situation that requires manual driving, the user may manually control the vehicle 1200 through the deceleration control object 1410, the acceleration control object 1420, the steering control objects 1430 and the gear control objects 1440 included in the GUI for controlling vehicle M1.

Hereinafter, explanation will be made with reference to FIGS. 31A to 31D on how the vehicle 1200 is actually controlled using the display device 1100.

FIGS. 31A, 31B, 31C and 31D are views illustrating how the vehicle 1200 is manually navigated by a vehicle control method according to an embodiment of the present disclosure.

Figure 31A:
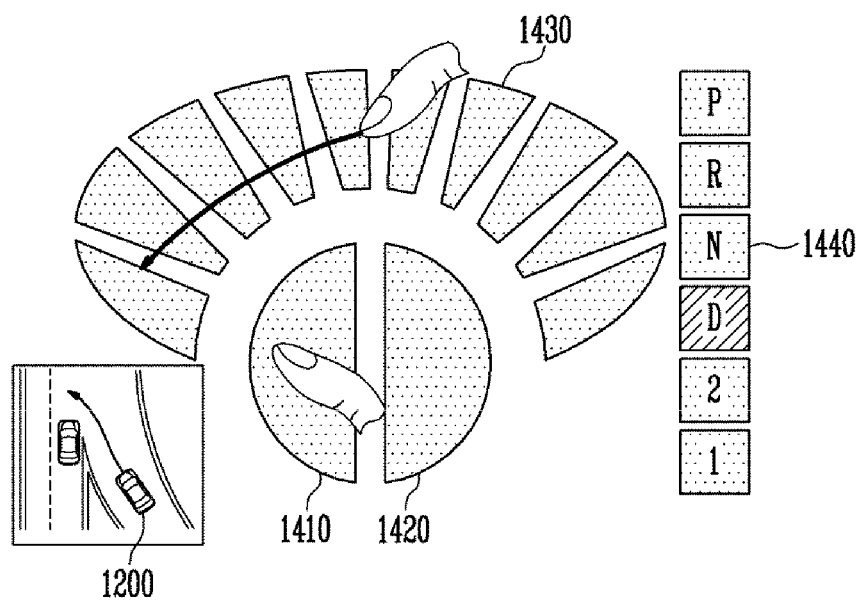
FIGS. 31A, 31B, 31C and 31D are views illustrating how a vehicle is being manually navigated by a vehicle control method according to an embodiment of the present disclosure.

FIG. 31A illustrates the vehicle 1200 making a left turn while reducing its velocity. The user may set the gear to D to make the vehicle 1200 go straight. For this purpose, of the gear control objects 1440, the user may touch the gear control object set to D gear.

Since there are many cases where the vehicle 1200 needs to go straight when entering the manual driving mode, when converting from the autonomous driving mode to the manual driving mode, the gear of the vehicle 1200 may be automatically set to D gear. In this case, there is no need for the user to make an additional input to control the gear of the vehicle 1200.

Further, in order to reduce the velocity of the vehicle 1200 and make the vehicle 1200 turn left, the user may touch the steering control objects 1430 while already touching the deceleration control object 1410.

By arranging the steering control objects 1430 to surround the deceleration control object 1410 and the acceleration control object 1420, the user may control the velocity and steering of the vehicle 1200 with one hand (for example, the thumb and the index finger).

The vehicle 1200 may decelerate in response to the intensity of the touch force being input regarding the deceleration control object 1410, and may turn left in response to the direction of the touch being input regarding the steering control objects 1430.

For example, the user may move the touch input regarding the steering control objects 1430 to the left side in order to make the vehicle 1200 turn left.

Figure 31B:
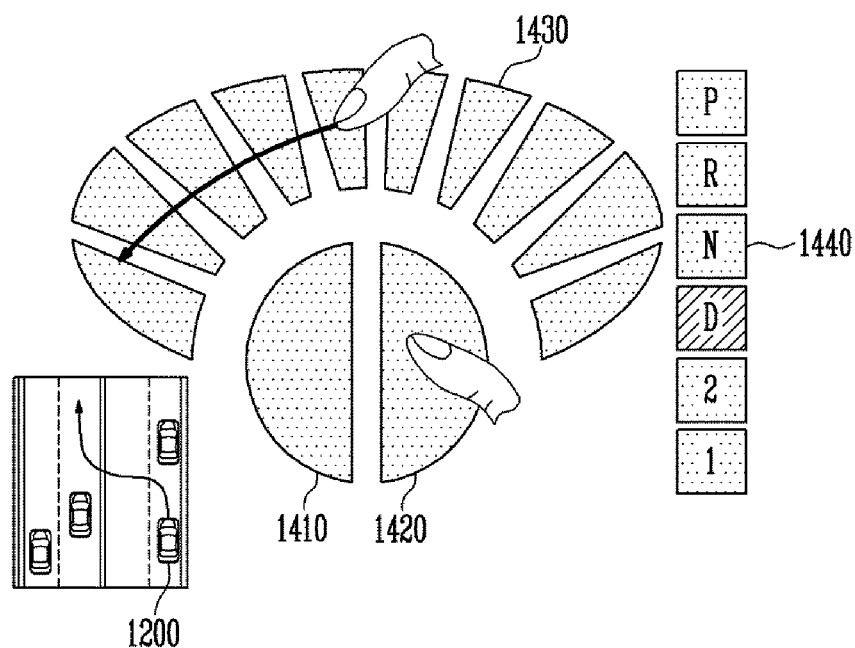

FIG. 31B illustrates the vehicle 1200 making a left turn while increasing its velocity.

The user may maintain the gear of the vehicle 1200 in D gear, that is the same as in FIG. 31A.

Further, for the vehicle 1200 to accelerate and make a left turn, the user may perform a touch on the steering control objects 1430 while already touching the acceleration control object 1420.

The vehicle 1200 may accelerate in response to the intensity of the touch force being input regarding the acceleration control object 1420, and may turn left in response to the direction of the touch being input regarding the steering control objects 1430.

For example, the user may move the touch input regarding the steering control objects 1430 to the left for the vehicle 1200 to make a left turn.

Figure 31C:
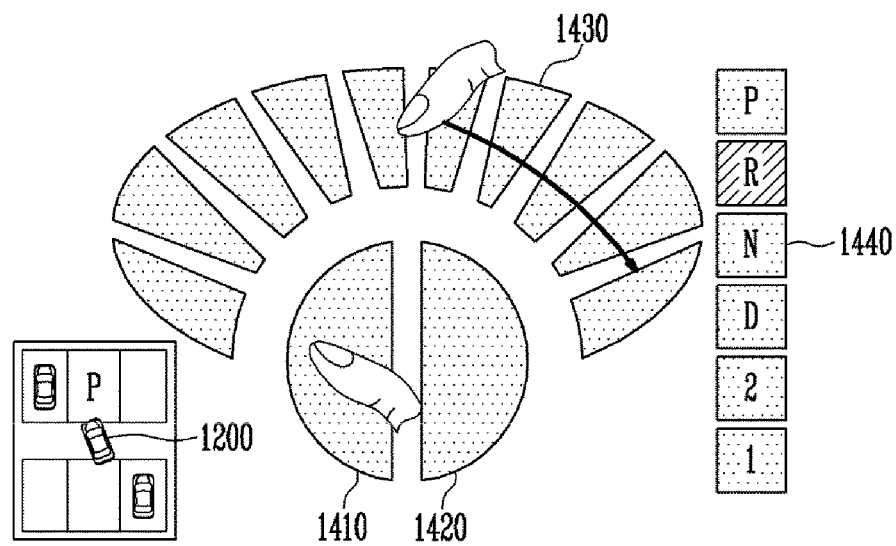

FIG. 31C illustrates the vehicle 1200 performing a rear-parking operation.

The user may set the gear to R gear to make a backward motion. For this purpose, of the gear control objects 1440, the user may touch the gear control object set to R gear.

When it is necessary to decelerate and steer control the vehicle 1200, when making a backward motion, the user may touch the steering control objects 1430 while already touching the deceleration control object 1410.

Figure 31D:
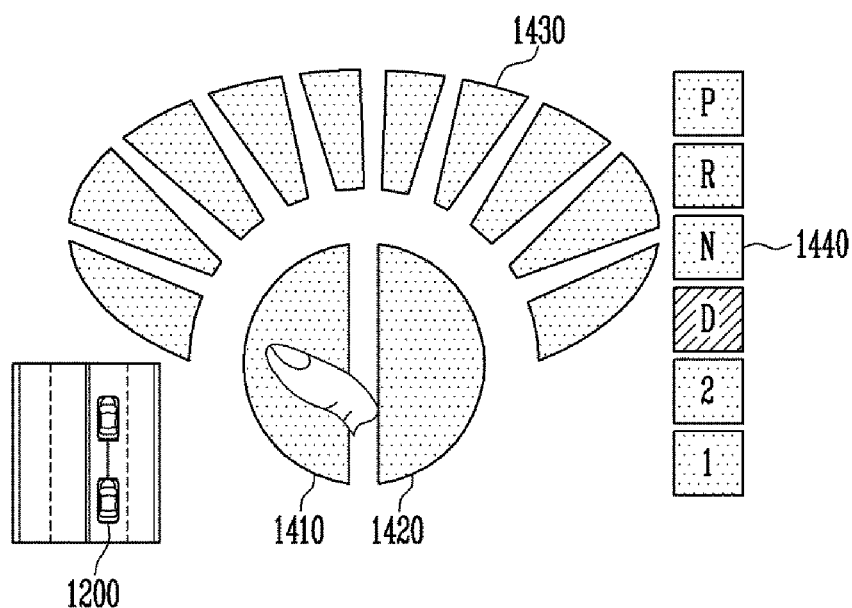

FIG. 31D illustrates how the vehicle 1200 decelerates while going straight.

The user may maintain the gear of the vehicle 1200 in D gear, that is the same as in FIG. 31A.

Further, in order to decelerate the vehicle 1200, the user may perform a touch on the deceleration control object 1410.

Here, since the vehicle 1200 is going straight, there is no need for an additional steering, and thus the touch input on the steering control objects 1430 may be omitted.

FIGS. 31A to 31D exemplify only some of vehicle drivings, and thus various types of driving controls may be made according to user's input.

According to the aforementioned embodiments of the present disclosure, it is possible to control vehicle driving through the display device connected to the vehicle via wireless network.

By doing this, passengers may control vehicle driving regardless of their locations, and accordingly, the risk of accidents may be significantly reduced in emergency situations.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A touch sensor comprising:
   a substrate; and
   a first sensor configured to sense a bending wave which is occurred by a touch input to compute an intensity of a force of a touch and a plurality of second sensors configured to sense a location of the touch,
   wherein the first sensor is disposed in a central area of one surface of the substrate, the plurality of second sensors are arranged to surround the first sensor, and a width of the plurality of second sensors increases as a distance from the central area increases, and
   wherein the intensity of the force of the touch is compensated based on a distance that the bending wave travels from the location of the touch sensed by the plurality of second sensors to the first sensor.

2. The touch sensor according to claim 1,
   wherein the first sensor is a force sensing sensor and the plurality of second sensors are capacitive sensors.

3. The touch sensor according to claim 1,
   further comprising a buffer member provided on the one surface of the substrate, spaced apart from the first sensor and formed to surround at least a portion of the first sensor.

4. The touch sensor according to claim 1,
   wherein the first sensor includes a plurality of sensors.

5. The touch sensor according to claim 1,
   wherein the substrate is a flat plane substrate having a circular shape.

6. The touch sensor according to claim 1,
   further comprising a sensor controller that computes the location and the intensity of the force of the touch using sensing signals obtained from the first sensor and the plurality of second sensors.

7. The touch sensor according to claim 6,
   wherein the sensor controller computes the location of the touch with reference to a polar coordinate.

8. The touch sensor according to claim 6,
   wherein the sensor controller computes an angle coordinate of the touch with reference to the sensing signals obtained from the plurality of second sensors.

9. The touch sensor according to claim 6,
   wherein the sensor controller computes a distance coordinate with reference to a time difference between the touch is sensed by the first sensor and the touch is sensed by the second sensor.

10. The touch sensor according to claim 9,
    wherein the sensor controller computes the intensity of the force sensed by the first sensor.

11. The touch sensor according to claim 10,
    wherein the sensor controller compensates for the sensed intensity of the force with reference to the distance coordinate of the touch.

12. The touch sensor according to claim 1,
    wherein the plurality of second sensors are provided on another surface facing the one surface of the substrate.

13. The touch sensor according to claim 1, wherein the substrate is a three-dimensional substrate having a dome shape.

14. A touch sensing method using a touch sensor that includes a first sensor sensing a bending wave which is occurred by a touch input to compute an intensity of a force of a single touch and a plurality of second sensors sensing a location of the single touch, the first sensor and the plurality of second sensors being disposed on a substrate, the method comprising:
    computing an angle coordinate of the single touch from signals sensed by the plurality of second sensors;
    computing a time difference between the single touch is sensed by the second sensors when the bending wave is occurred and the single touch is sensed by the first sensor when the bending wave reaches the first sensor;
    computing a distance coordinate of the single touch using the time difference; and computing a location of the single touch by combining the angle coordinate and the distance coordinate,
wherein the first sensor is disposed in a central area of the substrate and the plurality of second sensors are arranged to surround the first sensor.

15. The touch sensing method according to claim 14, further comprising computing the intensity of the force of the single touch using a signal sensed by the first sensor.

16. The touch sensing method according to claim 15, wherein the computing the intensity of the force of the single touch includes compensating the signal sensed by the first sensor using the distance coordinate.

17. The touch sensing method according to claim 14, wherein the distance coordinate is computed by the time difference and a velocity of the bending wave on the substrate.

18. The touch sensing method according to claim 14, wherein the first sensor is a force sensing sensor, and the plurality of second sensors are capacitive sensors.

* * * * *